United States Patent [19]
Adan et al.

[11] Patent Number: 5,754,828
[45] Date of Patent: May 19, 1998

[54] SYSTEM AND METHOD FOR POSITIONAL CONTROL DEVICE DATA SOURCE SELECTION

[75] Inventors: Manolito E. Adan, Woodinville; Michael W. Van Flandern, Redmond; Daniel Dean, Issaquah; Jeffrey A. Davis, Bothell, all of Wash.

[73] Assignee: Microsoft Corporation, Redmond, Wash.

[21] Appl. No.: 509,649

[22] Filed: Jul. 31, 1995

[51] Int. Cl.⁶ .................................................. G06F 9/455
[52] U.S. Cl. .................................................. 395/500
[58] Field of Search .................................. 395/500, 527, 395/385; 363/36–38

[56] References Cited

U.S. PATENT DOCUMENTS

| | | | |
|---|---|---|---|
| 4,888,680 | 12/1989 | Sander et al. | 395/500 |
| 5,121,472 | 6/1992 | Danish et al. | 395/275 |
| 5,287,534 | 2/1994 | Reuther et al. | 395/800 |
| 5,389,950 | 2/1995 | Bouton | 345/156 |

FOREIGN PATENT DOCUMENTS

| | | |
|---|---|---|
| 0 304 891 | 3/1989 | European Pat. Off. . |
| WO 94/16426 | 7/1994 | WIPO . |

OTHER PUBLICATIONS

*Logitech User's Manual*, May 1991, pp. 11–15, 21–24.
Rayhawk, J., *ACM–Pro Game Card –External Product Specification*, Nov., 1994, pp. 1–7.
"IBM Game Control Adapter," *IBM Personal Computer Hardware Reference Library*, pp. 1–9.

*Primary Examiner*—Kevin J. Teska
*Assistant Examiner*—Ayni Mohamed
*Attorney, Agent, or Firm*—Seed and Berry LLP

[57] ABSTRACT

A technique for emulating a computer game port uses a memory manager software program to detect output instructions from a computer software program to the game port. In response to the detected output instruction, the memory manager diverts program operation to an interrupt routine wherein position data is read from a data frame and one or more game port delay times are calculated to correspond with the position of the selected positional control device. The delay times correspond with the delay times of a conventional analog joystick coupled to a conventional game port. The memory manager also detects input instructions from computer software program to the game port and diverts the computer software program to an interrupt servicing routine in which the emulated delay times are used to load a data register that is read by the computer software program. The data bits in the data register correspond to the delay time bits and are initially set to a first logic level during the delay time period, and reset after the expiration of the delay time period. In this manner, any positional control device can be used to provide position data to emulate a computer game port. The computer may also contain a plurality of positional control devices, each supplying its position data in a predetermined format to the data frame within the computer memory. A data selector indicates the source in the data frame of each direction of positional control device movement. In response to intercepted output instructions from the computer software program, the system reads position data from the user selected data source and calculates the emulated delay times accordingly.

18 Claims, 21 Drawing Sheets

SYSTEM AND METHOD FOR POSITIONAL CONTROL DEVICE DATA SOURCE SELECTION

TECHNICAL FIELD

The present invention is directed in general toward cursor control devices, and more specifically, to a system and method for emulating the computer game port using a user selected cursor control input device.

BACKGROUND OF THE INVENTION

Personal computers are widely used for scientific applications, business applications, and entertainment. Most personal computers include a positional control device that allows the user to move a graphic object, such as a cursor, on a display screen to control the operation of the computer. Computer mice and trackballs are well-known forms of such positional control devices. Other positional control devices, such as joysticks, are also widely used. Joysticks are particularly common with entertainment software such as computer games. Other types of positional control devices include rudder pedals, game pads, flight yokes, and the like. These devices may be generically referred to as positional control devices.

The positional control devices are typically coupled to a host computer through an I/O port, such as a game port. The game port includes a plurality of analog input lines that form part of a timer circuit. The positional control devices, such as a conventional joystick, include potentiometers whose resistance changes as the user manipulates the positional control device. Thus, the positional control device includes analog resistances that form a complete timing circuit when connected to the game port.

There is a significant drawback to such analog positional control devices. In the case of a conventional joystick, two potentiometers are used to provide orthogonal position sensing using an X-Y coordinate system. The potentiometers typically have a resistance tolerance of at least ±10% and also have an angular tolerance of ±5% or more. Thus, there is a broad variation in resistance from one joystick to another as well as a significant amount of error in the position sensing for a given joystick.

To compensate for such variations, computer software manufacturers include a calibration routine that is used to calibrate the joystick-game port combination for the particular computer software program. However, the potentiometers within the joystick are also subject to thermal drift, causing position sensing errors even after the joystick, game port combination has been calibrated. The position sensing errors resulting from analog positional control devices present a significant problem.

Another drawback of current positional control devices is that a significant amount of computer processing time is required to determine the position using the variable resistance timing circuit discussed above. The host computer must poll the game port periodically to determine the status of the timers. Thus, the host computer must spend a significant amount of time calculating position based on the timing data from the game port.

Some positional control devices purport to be "digital" positional control devices. These devices are more appropriately designated as binary devices since they typically comprise one or more switches, such as a game pad in which a plurality of switches merely provide a binary input based on whether the switch is "open" or "closed." Thus, these devices may more accurately be designated as binary devices.

Yet another drawback of current position sensing technology is that the game port is strictly an input device. That is, the game port is incapable of communicating with the positional control device and merely accepts the analog inputs that form the timing circuit described above. Some positional control devices include additional circuitry, such as an analog to digital converter, to provide digital position data. However, these devices are incapable of operation with the game port because the game port cannot provide output data or commands to control the additional electrical circuitry. These devices are typically coupled to the host computer through an input/output port, such as a parallel port or a serial port.

Therefore, it can be appreciated that there is a significant need for a system and method for providing reliable position data to a host computer and to provide a means by which the host computer may have bidirectional communication with the positional control device. This, and other advantages, are provided by the present invention as will become apparent from the drawings taken together with the following description.

SUMMARY OF THE INVENTION

The present invention is embodied in a system and method to emulate operation of a computer game port having a predetermined input/output (I/O) address in a computer. The system includes a positional control device generating position data, and an instruction interceptor to detect input and output instructions from a computer software program running on the computer to the predetermined I/O address. The instruction interceptor generates an input interrupt vector in response to detecting input instructions to the I/O address. The instruction interceptor also generates an output interrupt vector in response to detecting an output instruction to the I/O address. A position calculator receives the position data in response to the output interrupt vector and calculates positional data corresponding to the received position data. A controller places the calculated positional data in a data register within the computer in response to the detected input instruction. The data register is read by the computer software program thus allowing the conventional game port positional control device to be emulated by virtually any positional control device.

The system may also include a delay timer to determine a position delay time based on the calculated positional data. The controller places emulation data in the data register as the calculated positional data. The emulation data has a first logic value during the position delay time period and a second logic value following the position delay time period.

In one embodiment, the positional control device is a joystick, and the position calculator determines the current position data based on a value of a resistance within the joystick. The position calculator measures a time delay period based on the resistance value to generate the calculated positional data.

The position calculator may disable the host computer while receiving the generated position data. The computer often uses a timing loop to determine the length of the delay time period. These timing loops are typically dependent on the processor power and clock rate. The system determines a loop count corresponding to the delay time period that is dependent on the clock rate and processor power thus making the time delay period measurement independent of the particular processor and clock rate. The joystick resistance may be encoded into a first predetermined range.

The system may also include a plurality of positional control devices coupled to the computer with each of the plurality of positional control devices generating position data. The system also includes a data source selector operable by a user to select the plurality of cursor control devices which are combined to produce the calculated positional data. The data source selector designates at least a portion of the position data generated by each of the selected positional control devices as corresponding to portions of the calculated positional data. The data source selector combines these portions to generate the calculated positional data. The system may also include a plurality of memory locations wherein each of the plurality of positional control devices stores the generated position data in a portion of the memory locations in a predetermined format. The data source selector includes a plurality of memory pointers, each indicating a location in the plurality of memory locations where the generated position data portions are stored.

In yet another embodiment, a system emulates operation of a game port having a predetermined I/O address in a computer. The system comprises a plurality of cursor control devices coupled to the computer with each of the positional control devices generating position data. A data source selector operable by the user, selects at least some of the plurality of cursor control devices to generate position data, with each selected data source providing at least a portion of the position data from each of the selected positional control devices as corresponding to the calculated positional data. The instruction interceptor detects input and output instructions from the host computer to the predetermined I/O address. The instruction interceptor generates an input interrupt vector in response to the detected input instructions and an output interrupt vector in response to the detected output instructions. A position calculator receives the generated position data portions in response to the output interrupt vector and combines the data portions to generate position data. The position calculator further calculates calculated positional data corresponding to the combined cursor data portions. A controller places the calculated positional data in a data register within the computer in response to the detected input instructions with the data register being read by a computer software program.

DETAILED DESCRIPTION OF THE INVENTION

Figure 1A:
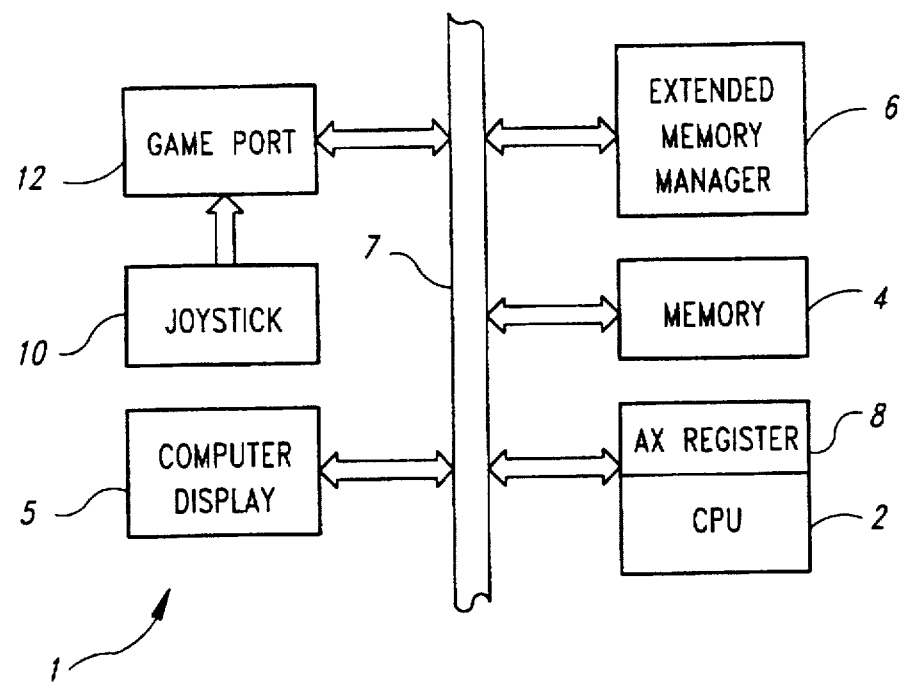
FIG. 1A is a functional block diagram of a conventional computer.

Most computers that operate computer games have a game port to which the joystick is connected. FIG. 1A is a functional block diagram illustrating selected elements of a conventional microcomputer 1. For the sake of brevity, not all components required for the operation of the computer 1 are shown in FIG. 1A. However, these elements are well known by those of ordinary skill in the art and need not be described herein. The computer 1 includes a central processing unit (CPU) 2, as well as a memory 4, which may include both read-only memory (ROM) and random access memory (RAM). As is well known in the art, advanced microprocessors, such as the Intel 80386, 80486, Pentium, and the like, utilize an extended memory manager 6 to control access to the memory 4. The extended memory manager 6 is typically a software element, such as the Microsoft EMM386.SYS, and may actually be part of the memory 4. The computer also includes a computer display 5 and its associated interface. The various components of the computer 1 are coupled together by a bus 7, which includes both data lines, control lines, and the like. The bus 7 may also distribute power to the various components of the computer 1.

As illustrated in FIG. 1A, the computer includes a conventional joystick 10 coupled to the bus 7 through a game port 12. The conventional joystick 10 and game port 12 function together to generate data corresponding to the position of the joystick. This position data, as well as data related to the state of one or more joystick buttons (see FIG. 1B) on the conventional joystick 10, are placed on the bus 7 and stored in an AX register 8 within the CPU 2 by the execution of the computer instructions "mov dx, 201" and "in ax, dx." For the sake of clarity, an output instruction to the game port will be designated as "OUT, 201H" while input instructions to the game port will be designated as "IN, 201H." The software program, such as a computer game, examines the contents of the AX register 8 to determine the position of the conventional joystick 10, as well as the condition of the buttons on the joystick. While the discussion presented herein is directed to the specific examples of the conventional joystick 10, those of skill in the art will appreciate that the principles of the present invention are applicable to any positional control device such as rudder pedals, game pads, flight yokes, and the like. The present invention is not limited by the specific form of the positional control device.

Figure 1B:
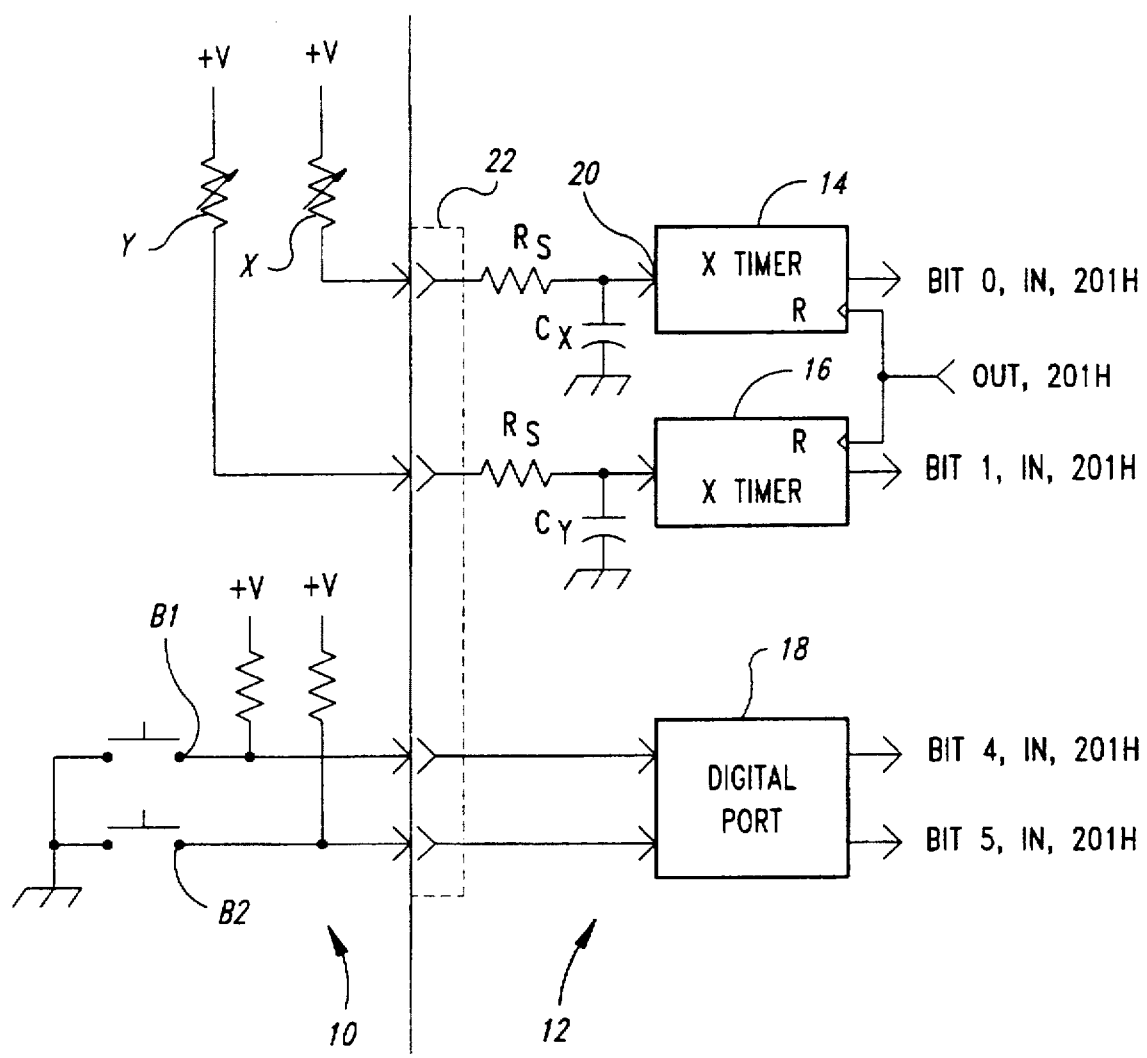
FIG. 1B is a detailed functional block diagram of a conventional joystick and game port of the computer of FIG. 1A.

FIG. 1B is a more detailed function block diagram that illustrates the conventional joystick 10 coupled to the game port 12 in the computer 1. The conventional joystick 10 includes a first potentiometer X coupled to the joystick to track movement of the joystick in a first dimension, designated herein as the X direction and typically associated with horizontal movement of the graphics objection the computer display 5. The conventional joystick 10 also includes a second potentiometer Y coupled to the joystick to track movement of the joystick in a second dimension transverse to the first dimension, designated herein as the Y direction and typically associated with vertical movement of the graphics objection the computer display 5. The X potentiometer is coupled to an X timer 14 within the game port 12, and the Y potentiometer is coupled to a Y timer 16 within the game port. The conventional joystick 10 also includes a first button B1 and a second button B2 coupled to a digital port 18 within the game port 12. The game port 12 uses an industry standard connector 22, which can accommodate two separate joysticks. However, it should be noted that the game port 12 of some computers does not include the electrical circuitry to support the use of a second conventional joystick. The conventional joystick 10 has a mating plug (not shown) that allows the joystick to be connected to the game port 12 through the connector 22. An adapter (not shown) is used to connect two joysticks to the connector 22 if the game port 12 has the electrical circuitry to support the second joystick. The pin configuration of the connector 22 is well known and need not be described herein.

The operation of the conventional joystick 10 into the game port 12 is well-known in the art. As the user manipulates the conventional joystick 10, the X and Y potentiometers change resistance values. The position of the conventional joystick 10 is determined by measuring the resistances of the X and Y potentiometers. For the sake of simplicity, the following discussion of the conventional joystick 10 and game port 12 will be limited to the determination of the X position of the joystick using the X potentiometer and the X timer 14. The conventional joystick 10 and game port 12 operate in the identical manner to determine the position of the joystick in the Y direction based on the resistance value of the Y potentiometer. To measure the resistance of the X potentiometer, the X timer 14 is triggered and generates a timing pulse whose width is dependent of the resistance of the X potentiometer. The resistance of the X potentiometer is directly related to the position of the joystick 10 in the X direction. The X timer 14 is activated by an output instruction from the CPU 2 to the game port 12. For purposes of this discussion the game port 12 will be assumed to use the industry standard I/O address of 201 hexadecimal (H). However, the specific I/O address is not considered a limitation to the invention. Most I/O devices have an output port, to which the CPU 2 transfers data using an "OUT, address" instruction, and an input port from which the CPU reads data using an "IN, address" instruction. The game port 12 has an input port (not shown) that contains joystick position data and button data. The game port 12 illustrated in FIG. 1B includes the input port, which comprises the outputs of the X and Y timers 14 and 16 and the outputs of the digital port 18. For the sake of clarity, the address decoding circuitry is not shown in FIG. 1B. However, this conventional circuitry is well known and need not be described herein. The game port 12 does not have an output port since no data is transferred from the CPU 2 to the game port. Although the game port 12 does not have an output port, it does respond to an output instruction from the CPU 2. The output instruction (i.e., OUT, 201H) to the game port 12 causes a timing capacitor $C_x$ the X timer 14 to charge to a predetermined voltage whereupon the capacitor $C_x$ is quickly discharged. Thus, the timer input 20 is reset substantially to 0 volts. The capacitor $C_x$ is coupled to a timer input 20 and charges to a predetermined voltage at a rate determined by a time constant formed by the charging circuit formed by the X potentiometer and the charging capacitor $C_X$. A resistance $R_s$, having a nominal value of 2.2 kilohms (K$\Omega$), is placed in series with the X potentiometer and thus forms part of the charging circuit. It is well-known to those of ordinary skill in the art that the time that it takes for the timer input 20 to charge to the predetermined voltage is dependent on the resistance value of the X potentiometer, the series resistance $R_s$ and the value of the timing capacitor $C_X$ which has a nominal value of 0.1 microfarads. The timing capacitor $C_X$ and the series resistance $R_s$ have fixed values, and as noted, the X potentiometer has a resistance value that is dependent on the position of the joystick 12 in the X direction (associated with horizontal cursor movement). By measuring the length of time that it takes for the timer input 20 to charge to the predetermined voltage, the CPU 2 can determine the resistance of the X potentiometer and thus the position of the joystick along the X direction.

Figure 2:
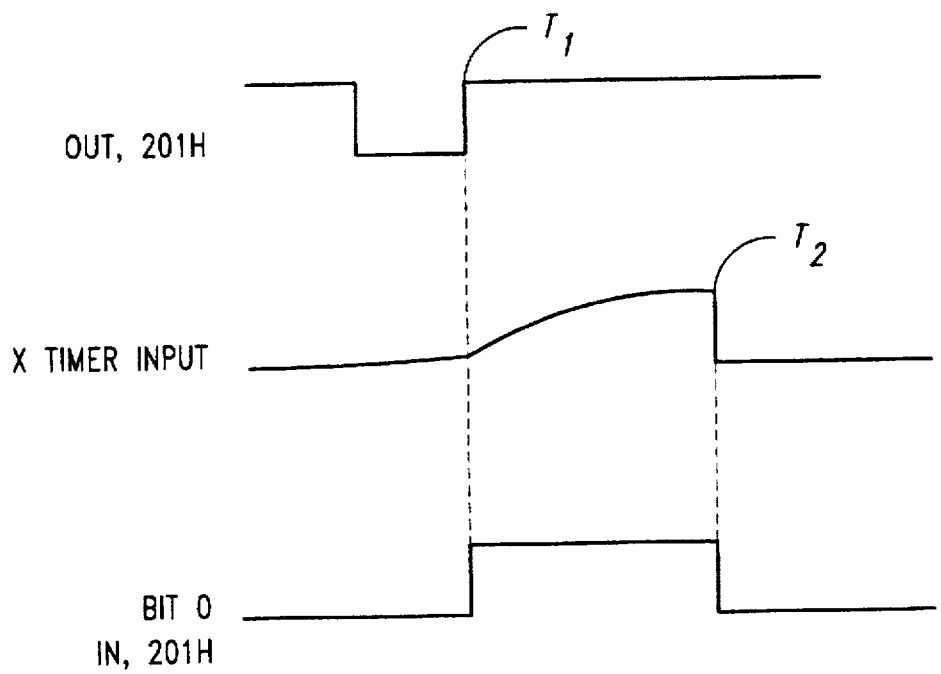
FIG. 2 is a waveform timing diagram of the conventional game port of FIG. 1B.

Typical waveforms illustrating the operation of the conventional joystick 10 and the game port 12 are shown in FIG. 2. At time $T_1$, the output instruction from the CPU 2 to the game port 12 initiates the beginning of the measurement sequence. At time $T_1$, the timer input 20 (see FIG. 1B) of the X timer 14 is reset to 0 volts and the capacitor $C_X$ begins to charge through the X potentiometer and the series resistance $R_s$, as previously described. For the sake of clarity, propagation delay times in the electrical circuitry have been ignored. However, those of ordinary skill in the art will recognize that such propagation delay times do exist. At the same time, $T_1$, bit 0 of the input port 201H is set to a high logic level. Bit 0 will remain at the high logic level until the timer input 20 reaches the predetermined voltage level at time $T_2$. When the timer input 20 reaches the predetermined voltage level at time $T_2$, the timer input and bit 0 in the input port 201H are reset to a low logic level. The application software operating in the computer 1 continuously reads the value of bit 0 into the AX register 8 and measures the elapsed time between time $T_1$ and time $T_2$. For the nominal values of $R_s$ and $C_x$ the elapsed time is given by the following equation:

$$T = 24.2 \text{ } \mu sec + 0.011 \times R \text{ } \mu sec \tag{1}$$

where T is the elapsed time, and R is the resistance value of the X potentiometer. The resistance range of the typical X potentiometer is 0–100 kilohms (KΩ). This corresponds to an elapsed time range 24.2 microseconds to 1.12 milliseconds.

The Y potentiometer and Y timer 16 operate in an identical manner and are also triggered by the output instruction to the game port 12 which resets the Y timer. The output of the timer 16 is bit 1 of the input port 201H. In this manner, the computer software in the computer 1 measures the elapsed time resulting from both the X and Y potentiometers, and thus determines the position of the joystick in the first and second dimensions (i.e., the X and Y directions of graphics object movement, respectively).

The conventional joystick 10 uses the X potentiometer and Y potentiometer in conjunction with the fixed capacitors $C_X$ and $C_Y$, respectively, to control the duration of X and Y timers 14 and 16, respectively. The computer software, such as a computer game, resides within the memory 4. The CPU 2 executes instructions in the computer software. To determine the position of the conventional joystick 10, the CPU 2 transmits the OUT, 201H instruction to the game port 12. The output instruction initiates the measurement sequence described above. To read data from the game port 12, the CPU 2 executes an IN, 201H instruction, which causes the contents of the input port 201H to be transferred from the game port 12 to the AX register 8 in the CPU 2. The CPU 2 must read the data from the game port in a manner that permits the measured(?) of the time period in the X and Y timers 14 and 16. This is accomplished by a number of different well-known techniques such as repeatedly executing the IN, 201H instruction and reading the contents of the AX register 8 until both bits 0 and 1 of the AX register have been returned to a low logic level. When either one of the bits 0 and 1 in the AX register 8 returns to a low logic level, the computer software computes the delay time by determining the number of times that the input port 201H was read. A similar calculation is performed on the remaining bit in the input port. Thus, the computer software determines the position of the conventional joystick 10 by calculating the number of times that the input port 201H was read for each of the X and Y directions. Alternatively, the computer 1 may utilize an internal timer (not shown) to measure the duration of the X and Y timers 14 and 16. As can be seen from the two examples above, the computer 1 must measure the time duration of the X and Y timers 14 and 16 in some manner.

It should be noted that the conventional joystick 10 is solely an input device. The game port 12 does not transmit any commands or data to the conventional joystick 10. The only "data" transferred by the OUT, 201H instruction is a command to start the timing sequence described above. It should also be noted that the game port 10 does not generate any interrupts to the host computer. Rather, the game port 12 is a polled device that is activated by the computer software, and continuously monitored by the computer software. The disadvantage of this process is that the computer software wastes a large amount of computer processing time by monitoring the bits in the input port 201H. Furthermore, other interrupts in the computer system may occur that will interrupt the continuous monitoring process described above. This may result in an inaccurate measurement of the elapsed time if bit 0 in input port 201H changes logic states while the host computer is processing the interrupt. One alternative is to disable the interrupts during this monitoring process. However, this is not a desirable solution since many important timing functions within the computer 1 depend on the interrupt system. Another significant disadvantage of the game port 12 is that it is incapable of sending commands to the conventional joystick 10. Some new joysticks utilize an analog-to-digital converter to convert the potentiometer values to digital values that can be read by the computer. However, these types of joysticks cannot be used with the game port 12 because the game port is incapable of sending commands to the joystick.

The present invention is directed to various aspects of data communication between a computer positional control device, such as a joystick, and the computer 1 to which the positional control device is coupled. The interface is capable of bidirectional communication with the conventional game port 12 (see FIG. 1A). In addition, the present invention dynamically configures data to maximize the data transfer rate between the positional control device and the host computer. If a joystick is not available, the system can emulate the joystick 12 or permit other positional control devices to emulate the joystick and can even emulate a game port if one is not available on the host computer.

Figure 3A:
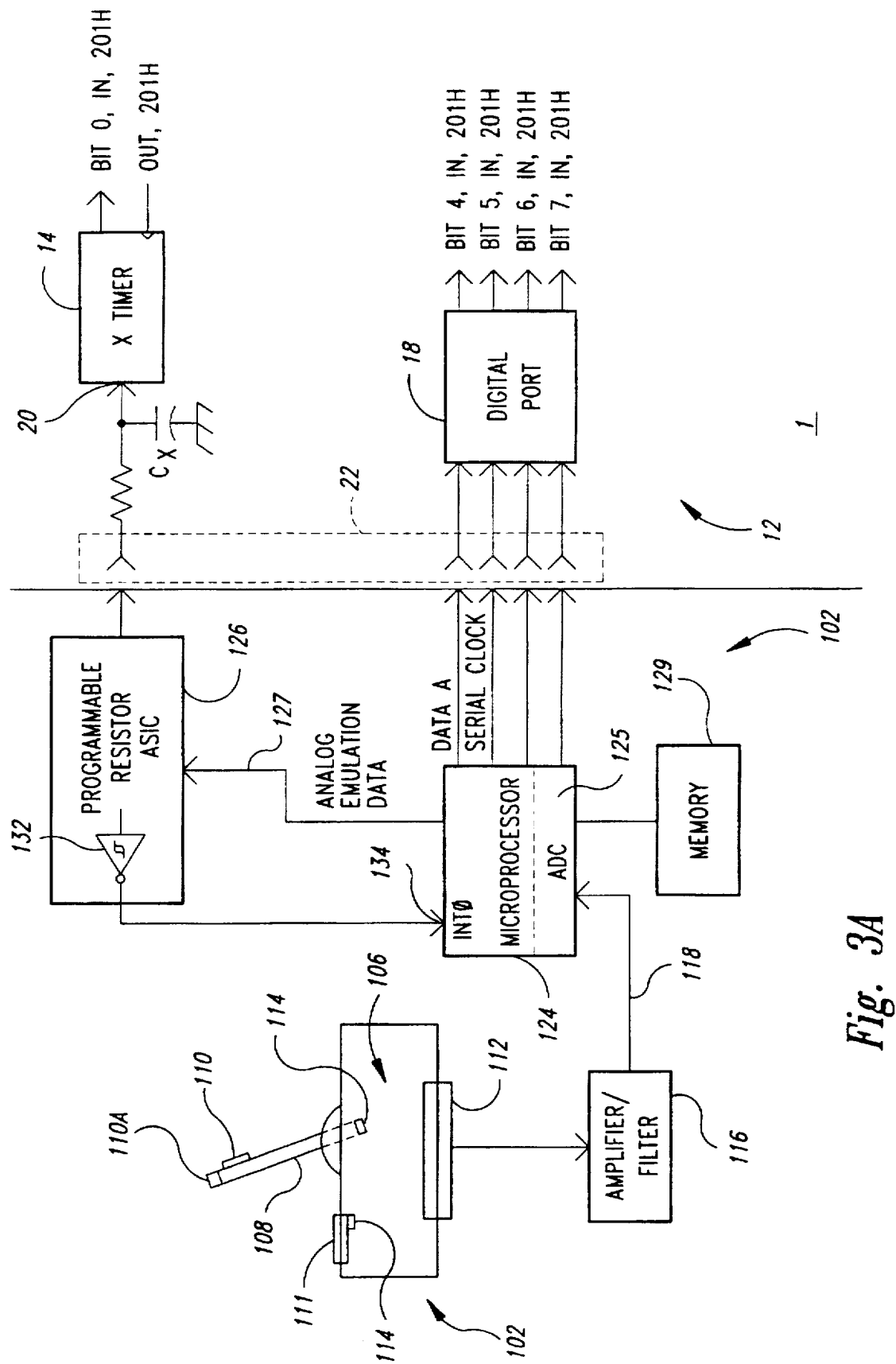
FIG. 3A is a functional block diagram of the system of the present invention.

The present invention is embodied in a system 100 shown in the functional block diagram of FIG. 3A. In FIG. 3A, the conventional joystick 10 (see FIG. 1) has been replaced with a digital joystick 102. Although the following description includes references to the digital joystick 102, the digital joystick is not essential for all aspects of the invention. For example, the game port emulation discussed above does not require the use of the digital joystick 102.

The digital joystick 102 includes a position sensing circuit 106 in which the user manipulates a control stick 108 to determine the position of the control stick in the X and Y directions. The control stick 108 contains one or more buttons 110 positioned on the control stick to permit depression of the buttons as the user manipulates the control stick. In addition to the control stick 108, the digital joystick 102 includes a slidable member 111 whose position is independently determined. Furthermore, the digital joystick 102 is capable of calculating a rotational (R) position of the control stick 108, in addition to the X and Y directions discussed above. This permits the user to rotate the control stick 108 about its longitudinal axis to generate additional position data in the digital joystick 102. Thus, the digital joystick 102 has four independent movements, or degrees of freedom. The X, Y, and R degrees of freedom are controlled by the position of the control stick 108, while the fourth degree of freedom is provided by the slidable member 111. The digital joystick 102 determines the X, Y and R position of the control stick 108, the positions of the slidable members 111, and the position of all of the buttons 110. In the presently preferred embodiment, the digital joystick 102 can have up to twelve physical buttons 110.

The digital joystick 102 is capable of two modes of operation with the game port 12 (see FIG. 1A). In a first mode of operation, the digital joystick 102 generates a 64-bit digital data packet that can be transferred directly from the digital joystick to the game port 12. In a second mode of operation, the digital joystick 102 emulates the conventional joystick 10 (see FIG. 1). A state transition diagram, shown in FIG. 4, includes a Digital Transmission Mode 300 and an Analog Emulation Mode 302 corresponding to the first and second modes of operation, respectively. In the Digital Transmission Mode 300, the digital joystick 102 transmits digital data directly to the digital port 18 (see FIG. 3C) of the game port 12. The specific form of the 64-bit data packet will be described in detail below. In the Analog Emulation Mode 302, the digital joystick 102 emulates the conventional joystick 10 (see FIG. 1) by emulating resistance values that correspond to the resistance values of the X and Y potentiometers of the conventional joystick 10. The emulated resistances are coupled from the digital joystick 102 to the X timer 14 and the Y timer 16 in a manner identical to the operation of the conventional joystick 10. This advantageously provides the ability to emulate the conventional joystick 10 without requiring any additional computer software within the computer 1 to operate the digital joystick 102.

The Analog Emulation Mode 302 of the digital joystick 102 permits backward compatibility with existing computer software. In this manner, the digital joystick 102 can be used with computer software that does not have the capability of processing digital data from the digital joystick 102. In one embodiment, the digital joystick 102 initially powers up in the Analog Emulation Mode 302 and changes to the Digital Transmission Mode 300 in response to a command from the game port 12.

The normal state of the system 100 in the Digital Transmission Mode 300 is a Digital Idle state 304. The digital joystick 102 automatically exits the Digital Idle state 304 periodically to compute data corresponding to the position of the control stick 108 (see FIG. 3A). This is illustrated by a Compute Axis/Data state 306. This includes the X, Y, and R position data, slidable member 111 position data, as well as position data corresponding to the position of the buttons 110.

After the digital joystick 102 computes the position data in the Computer Axis/Data state 306, it enters a Latch Buttons data state 308. In the Latch Buttons state 308, the digital joystick 102 determines the position of each of the buttons 110 and latches this button data into output lines coupled to the digital port 18 (see FIG. 3A). Latching the button data for the buttons 110 in the Latch Buttons state 308 permits the computer software in the computer 1 to read the button values without transferring the entire 64-bit data packet generated by the digital joystick 102. The computer 1 can determine the position of the buttons 110 at any time by executing a single input instruction (i.e., IN, 201H) at any time without the necessity of determining the position of the control stick 108 by executing the OUT, 201H instruction.

After the digital joystick 102 has latched the button values in the Latch Buttons state 308, it returns to the Digital Idle state 304. In the presently preferred embodiment, the digital joystick 102 calculates the position of the control stick 108, the slidable member 111, and the buttons 110 approximately 200 times per second. Thus, the digital joystick 102 provides frequent updates of the position data. However, it should be noted that, while the positions of the control stick 108, the slidable member 111, and buttons 110 are automatically calculated, that data is not transmitted to the game port 12 (see FIG. 3A) except in response to a "Send Data" command from the game port 12. As will be described in detail below, the system 100 permits the game port 12 to send a limited number of commands to the digital joystick 102.

In response to the Send Data command, the digital joystick 102 enters a Send Data state 312 and transmits the 64-bit digital data packet to the game port 12. The format of the 64-bit digital data packet will be described in greater detail below. If the digital joystick 102 completes transmission of the 64-bit digital data packet without receiving an additional command, it exits the Send Data state 312 and returns to the Digital Idle state 304. If a "Send ID" command is sent to the digital joystick 102 while the digital joystick is in the Send Data state 312, the digital joystick completes its transmission of the 64-bit digital data packet and enters a Send ID state 316. As will be discussed in detail below, the digital joystick 102 transmits a digital ID data packet in response to the Send ID command. When the digital joystick 102 completes the transmission of the digital ID data packet, it returns to the Digital Idle state 304 if no additional commands have been received. If a "Go Analog" command is received from the computer 1 (see FIG. 3A) while the digital joystick 102 is in the Send ID state 316, the digital joystick 102 enters a Go Analog state 320 and enters the Analog Emulation Mode 302.

In the Analog Emulation Mode 302, the normal state of the digital joystick 102 is an Analog Idle state 324. The digital joystick 102 automatically exits the Analog Idle state 324 periodically to determine the position of the control stick 108 (see FIG. 3C), as previously described. The digital joystick 102 exits the Analog Idle state 324 and enters a Compute Axis/Data state 326 to calculate the position of the control stick 108, as well as the position of the slidable member 111 and the buttons 110. The digital joystick 102 in the Analog Emulation Mode 302, calculates the position of the control stick 108, the slidable member 111, and the buttons 110 approximately 200 times per second. After the digital joystick 102 has determined the position of the control stick 108, the slidable member 111, and the buttons 110, it exits the Compute Axis/Data state 326 and enters an Emulate Resistors state 330. In the Emulate Resistors state 330, the digital joystick 102 emulates the value of resistances for the X and Y potentiometers (see FIG. 1) that correspond to the X and Y positions, respectively, of the control stick 108 (see FIG. 3A), as well as the R position of the control stick and the position of slidable member 111. The Emulate Resistors state 330 will be discussed in greater detail below. Following the emulation of the resistors, the digital joystick 102 (in the Analog Emulation Mode 302) leaves the Emulate Resistors state 330 and enters a Latch Buttons state 331. The Latch Buttons state 331 in the Analog Emulation Mode 302 operates in an identical manner to the Latch Buttons state 308 of the Digital Transmission Mode 300. That is, the button data for the buttons 110 on the digital joystick 102 are latched into the digital port 18 (see FIG. 3A) and can be read by the computer software using the input instruction (e.g., IN, 201H). After the digital joystick 102 has latched the button values, it exits the Latch Buttons state 331 and returns to the Analog Idle state 324.

While in the Analog Emulation Mode 302, the digital joystick 102 is also capable of receiving commands from the game port 12 in a manner similar to that described above for the Digital Transmission Mode 300. However, the digital joystick 102 in the Analog Emulation Mode 302 processes only a single command from the game port 12. That single command places the digital joystick 102 in the Digital Transmission Mode 300. The digital joystick 102 (in the Analog Emulation Mode 302) changes from the Analog Idle state 324 to a Go Digital state 332 in response to a "Go Digital" command from the computer 1 (see FIG. 3A). The digital joystick 102 changes from the Go Digital state 332 to the Digital Idle state 304 in the Digital Transmission Mode 300. The nature of the Go Digital command used to switch from the Analog Emulation Mode 302 to the Digital Transmission Mode 300 will be described in greater detail below.

Returning momentarily to FIG. 3A, the position sensing circuit 106 of the digital joystick 102 uses optical position sensing techniques to determine the X, Y, and R position of the control stick 108 and the position of the slidable member 111. The position sensing circuit 106 is illustrated in greater detail in FIG. 3B, and includes a photodetector array 112 that senses light emitted from a pair of light sources 114a and 114b, such as a conventional light, a light-emitting diode, or the like. The photodetector array 112 generates electrical signals indicative of the intensity of detected light. The photodetector array 112 comprises four independent photodetector elements 112a–112b arranged in a planar arrangement. Each of the four photodetector elements 112a–112d in the photodetector array 112 produces an independent output whose value is dependent upon the intensity of light striking the particular element in the photodetector array 112.

Figure 3B:
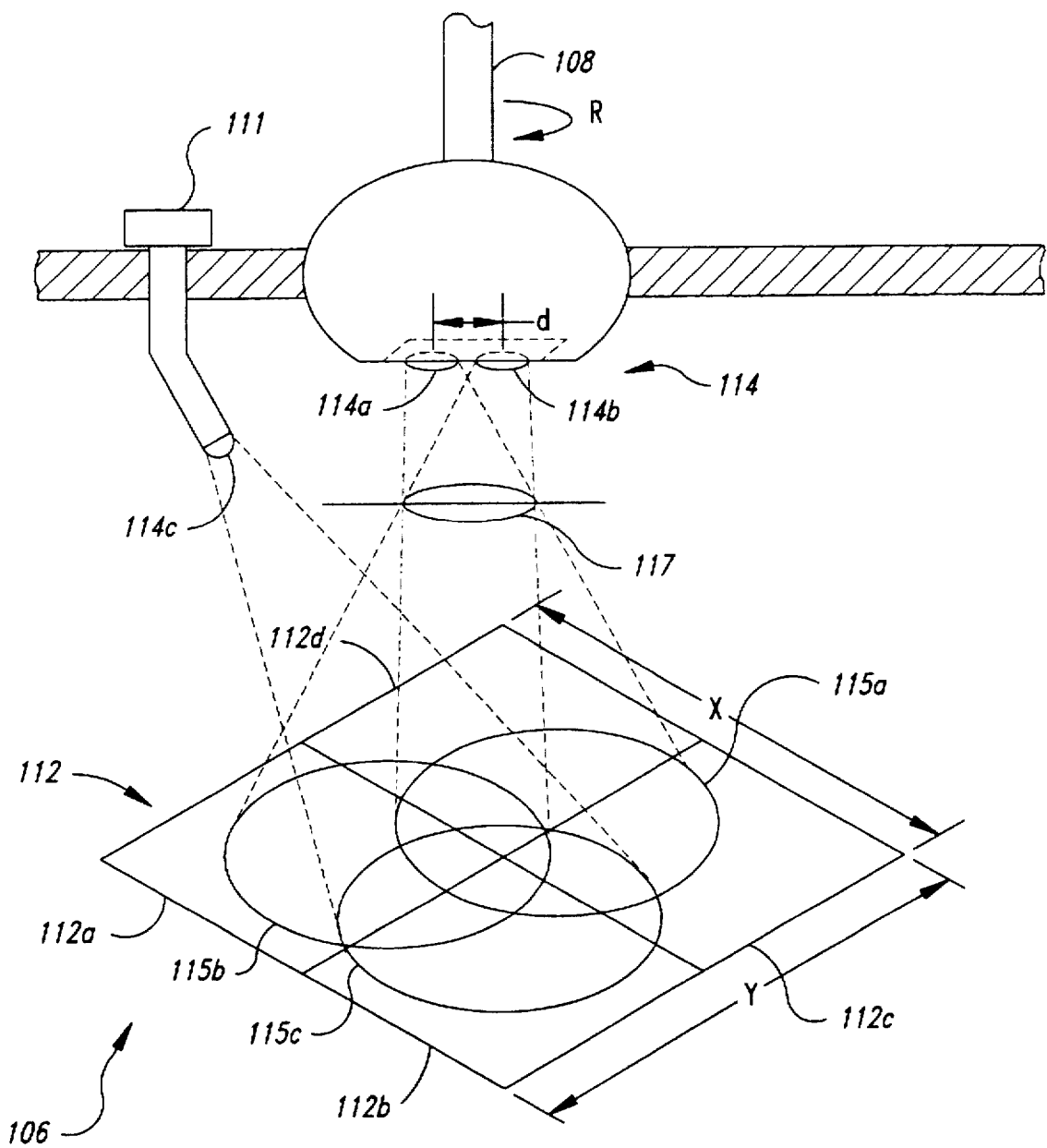
FIG. 3B illustrates an optical position sensing circuit of a digital joystick used in the system of FIG. 3A.

Following is a brief description of the position sensing circuit 106. However, additional details of the optical position sensing may be found in U.S. Patent Application No. (not yet available), entitled "Input Device For Providing Multi-Dimensional Position Coordinate Signals To A Computer," filed on Jul. 31, 1995, and incorporated herein by reference in its entirety. The X and Y positions of the control stick are determined using the light source 114a. As seen in FIG. 3B, the position of the illuminated area 115a and the intensity of light on each of the elements 112a–112d on the photodetector array 112 varies as the control stick 108, and hence the light source 114a, are manipulated by the user. The output of each of the elements 112a–112d is analyzed to determine the X and Y positions of the control stick 108. The mathematics used to determine the position of the control stick 108 are readily apparent to those of ordinary skill in the art and need not be discussed herein. The two light sources 114a and 114b are mounted in a coplanar arrangement and separated by a predetermined distance illustrated by the reference letter "d" in FIG. 3B. An aperture 117 is placed between the light sources 114a–114b and the photodetector array 112. The aperture 117 is circular in shape and has an area approximately equal to the active area of one of the elements 112a–112d of the photodetector array 112. The aperture 117 is positioned such that light from the light sources 114a and 114b provides some illumination on each of the elements 112a–112d of the photodetector array 112. Furthermore, the aperture 117 is positioned such that all of the light from the light sources 114a and 114b always strikes the active surface of the photodetector array 112. In this manner, all light from the light sources 114a and 114b illuminates the four elements 112a–112b of the photodetector array 112, with different elements receiving varying amounts of light depending on the position of the control stick 108.

For example, the light from each of the light sources 114a and 114b illuminates areas 115a and 115b, respectively, of the photodetector array 112 corresponding to a particular position of the control stick 108. Using geometry and simple mathematics, the X, Y and R position of the control stick 108 may be readily determined.

The addition of the light source 114b on the control stick 108 allows the R position of the control stick to be determined. In the presently preferred embodiment, the light sources 114a and 114b are time-division multiplexed so that only one light source is on at any given moment in time. By independently calculating the position of the illuminated areas 115a and 115b, the digital joystick 102 can determine the R position of the control stick 108.

In addition to determining the X, Y, and R positions of the control stick 108, the digital joystick 102 determines the position of the slidable member 111. The slidable member 111 includes a third light source 114c, whose light is also directed onto the photodetector array 112 to produce an illuminated area 115C. The light source 114c is also time-division multiplexed with the light sources 114a and 114b so that only one of the three light sources 114a–114c is on at any given moment in time. The digital joystick 102 determines the position of the slidable member 111 based on the intensity of light cast upon the photodetector array 112 when the light source 114c is illuminated in the same manner as the light source 114a is used to determine the X and Y position of the control stick 108. Thus, the photodetector array 112 generates electrical signals related to the X, Y, and R positions of the control stick 108, as well as the position of the slidable member 111.

Returning again to FIG. 3A, the signals generated by the photodetector array 112 are processed by an amplifier/filter 116 in a well-known manner. The processed analog signals are coupled by control lines 118 to a microprocessor 124. The microprocessor 124 is a conventional component utilizing a memory 129, which may include both ROM and RAM, as well as other conventional microprocessor elements such as I/O ports (not shown), whose operation need not be described in detail herein. In the presently preferred embodiment, the microprocessor 124 is a Mitsubishi M37478M2 microcontroller, which includes an integral analog-to-digital converter (ADC) 125. The ADC 125 in the microprocessor 124 converts the processed analog signals on the control lines 118 to digital signals for further processing. The microprocessor 124 processes the digitized signals to determine the positions of the control stick 108 and the slidable member 111. The microprocessor 124 generates digital position data corresponding to the X, Y, and R positions of the control stick 108 and the position of the slidable member 111.

Figure 4:
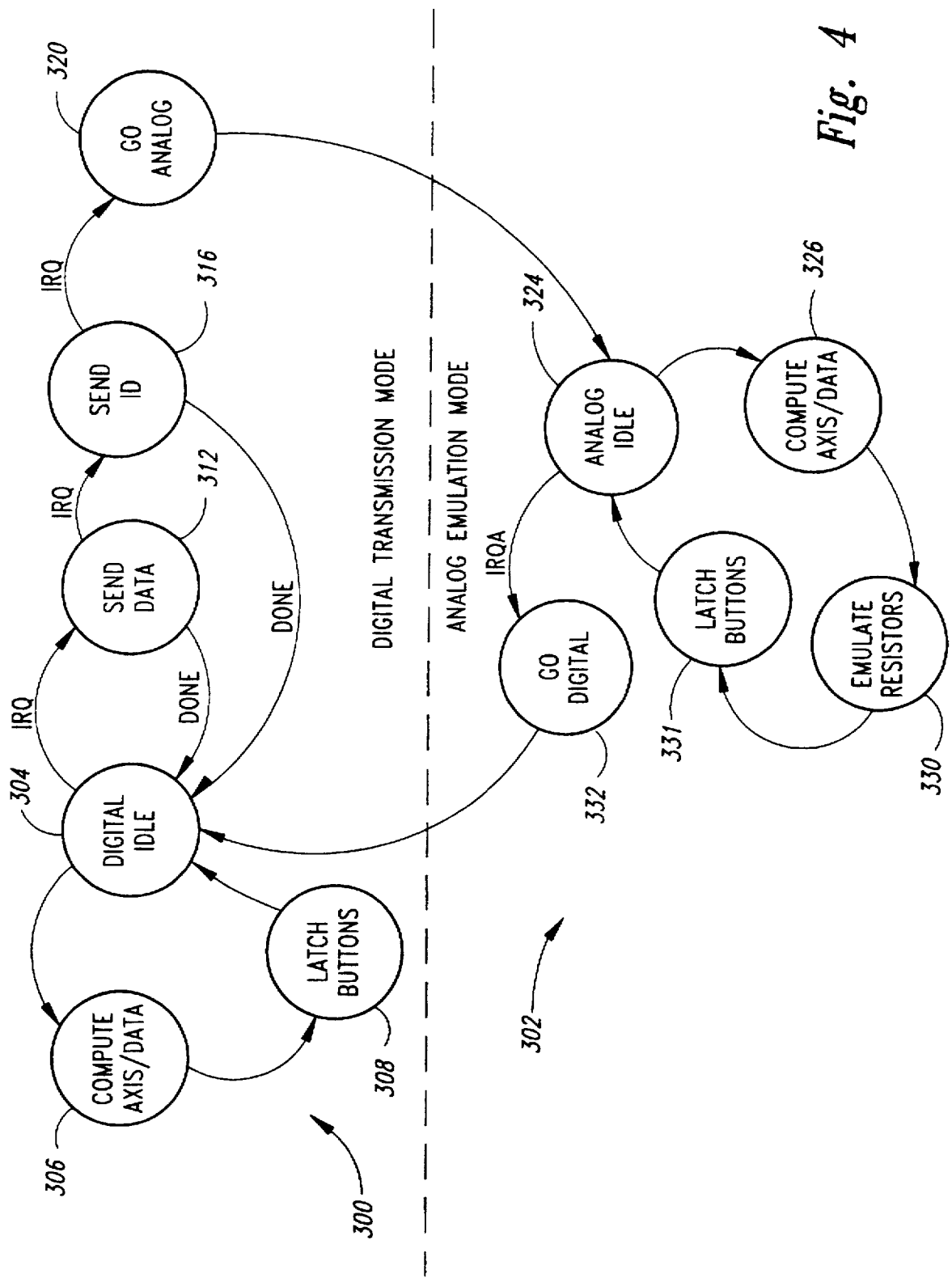
FIG. 4 is a state diagram of the system of FIG. 3A.

The digital position data corresponding to the positions of the control stick 108 and the slidable member 111 may be transmitted to the digital port 18 of the game port 12 if the digital joystick 102 is operating in the Digital Transmission Mode 300 (see FIG. 4). The digital position data transmission will be discussed in greater detail below. Alternatively, the microprocessor 124 can emulate the conventional joystick 10 (see FIG. 1) if the digital joystick 102 is operating in the Analog Emulator Mode 302 (see FIG. 4). The microprocessor 124 emulates the conventional joystick 10 by calculating resistance values for the X and Y potentiometers (see FIG. 1B) corresponding to the current position of the control stick 108. The digital joystick 102 includes a programmable resistor application specific integrated circuit (ASIC) 126. The microprocessor 124 generates analog emulation data corresponding to the calculated resistance values for the X and Y potentiometers. The ASIC analog emulation data is coupled to the ASIC 126 by analog emulation data lines 127. The operation of the ASIC 126 and the generation of analog emulation data will be described in greater detail below.

Figure 3C:
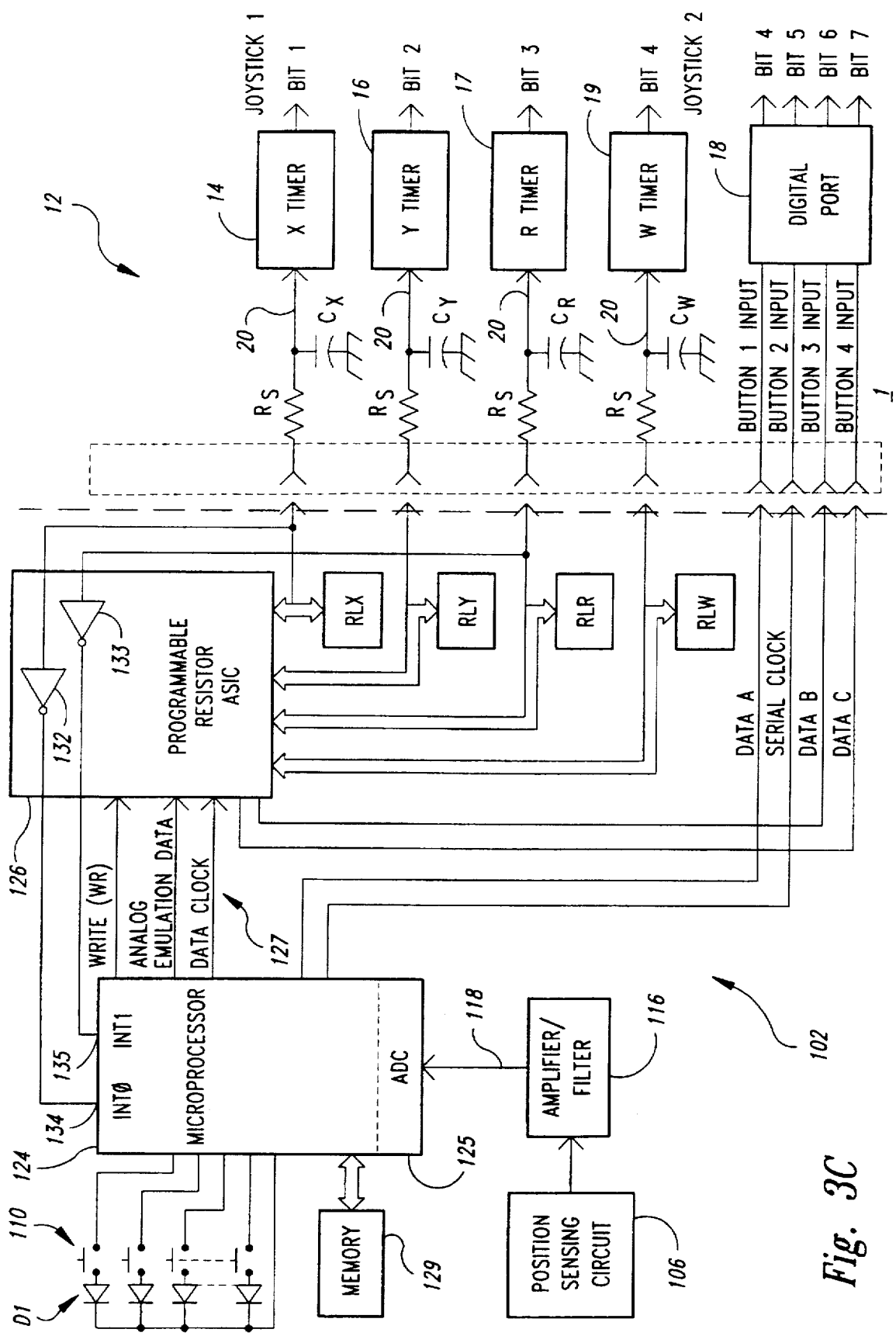
FIG. 3C is a detailed functional block diagram of the system of FIG. 3A.

A more detailed block diagram of the digital joystick 102 is shown in FIG. 3C. As described above, the position sensing circuit 106 generates analog signals indicative of the X, Y, and R position of the control stick 108 (see FIG. 3B), as well as the position of the slidable member 111. The signals from the position sensing circuit 106 are coupled to the ADC 125 via the amplifier/filter 116. As previously discussed, the digital joystick 102 may include up to twelve physical buttons 110. The buttons 110 are coupled to the microprocessor 124 using a conventional switch matrix which includes diodes D1 which form a portion of the switch matrix. The operation of the switch matrix is well known and will not be described in greater detail herein. Simple alteration of the 64-bit data packet, or an increase in the size of the data packet, would permit the addition of more buttons 110 on the digital joystick 102.

The digital position data generated by the microprocessor 124 is supplied directly to the digital port 18 in the game port 12 if the digital joystick 102 is operating in the Digital Transmission Mode 300 (see FIG. 4). In the Digital Transmission Mode 300, the microprocessor 124 transfers the data from the position sensing circuit 106 and the buttons 110 to the digital port 18 using button 1 input line of the digital port as a serial data in, and using button 2 input line of the digital port as a serial clock. As will be described in greater detail below, the data from the microprocessor 124 is synchronously transferred to the game port 12 using the serial data line and the serial clock line.

The digital joystick 102 is also capable of emulating the conventional joystick 10 using the Analog Emulation Mode 302. In the Analog Emulation Mode 302, the digital joystick 102 computes the position of the control stick 108 (see FIG. 3A). The digital joystick 102 determines the X, Y, and R positions of the control stick 108, as well as the position of the slidable member 111. Once these four positions have been determined, the microprocessor 124 can determine the corresponding resistance values using Equation (1), which was previously discussed with respect to the conventional joystick 10. These four resistance values are subsequently converted to an 8-bit value to be transmitted to the ASIC 126, so that the digital joystick 102 can emulate the proper resistance values. Alternatively, the microprocessor 124 can use a look-up table to translate the position data directly into an 8-bit value for transmission to the ASIC 126. The look-up table is stored in the memory 129 (see FIG. 3C). The use of look-up tables to convert data is well known in the art, and need not be described in detail.

In the Analog Emulation Mode 302, the microprocessor 124 transmits the analog emulation data to program the ASIC 126. The ASIC 126 functions primarily as a four channel programmable resistor, corresponding to the X, Y, and R positions of the control stick 108, and the position of the slidable member 111. The ASIC 126 is programmed by the microprocessor 124 to have resistance values that correspond to the position of the control stick 108 and the slidable member 111. It should be noted that these emulated resistances correspond to the potentiometers in the conventional joystick 10.

When the digital joystick 102 is in the Analog Emulation Mode 302, the ASIC 126 receives the analog emulation data, which is transferred serially on one line of the ASIC data lines 127, while an analog emulation data clock is transferred on a second of the ASIC data lines. Four external resistor ladder networks are coupled to the ASIC 126 to emulate the analog resistances corresponding to the X, Y, and R positions of the control stick 108 and the slidable member 111. Specifically, an RLX resistor ladder network for the X position is programmed to have a selected resistance value corresponding to the X position of the control stick 108. Similarly, an RLY resistor ladder network is used to select the appropriate resistance value for the Y position of the control stick 108. In addition, a RLR resistor ladder network is used to emulate a resistance corresponding to the R position of the control stick 108, while an RLW resistor ladder network is used to emulate a resistance corresponding to the position of the slidable member 111.

Each of the emulated resistances is coupled to a corresponding timer within the game port 12. As previously discussed, the X timer 14 and the Y timer 16 are used to determine the X and Y positions, respectively, of the control stick 108. The resistance emulated by the RLX resistor ladder network is coupled to the timer input 20 of the X timer 14, while the resistor ladder network RLY is coupled to the timer input 20 of the Y timer 16. If the game port 12 has the electrical circuitry for the second joystick, the RLR resistor ladder network and the RLW resistor ladder network are coupled to the timer inputs 20 of an R timer 17 and a W timer 19, respectively. In this fashion, the digital joystick 102 can provide a true analog emulation of the conventional joystick 10 (see FIG. 1B). It should be noted that the digital joystick 102 does not require any additional computer software within the computer 1 (see FIG. 1A) when operating in the Analog Emulation Mode 302. This advantageously allows the digital joystick 102 to be coupled to the game port 12 and to operate in the Analog Emulation Mode 302 with existing computer software programs without any system reconfiguration required by the user.

Figure 3D:
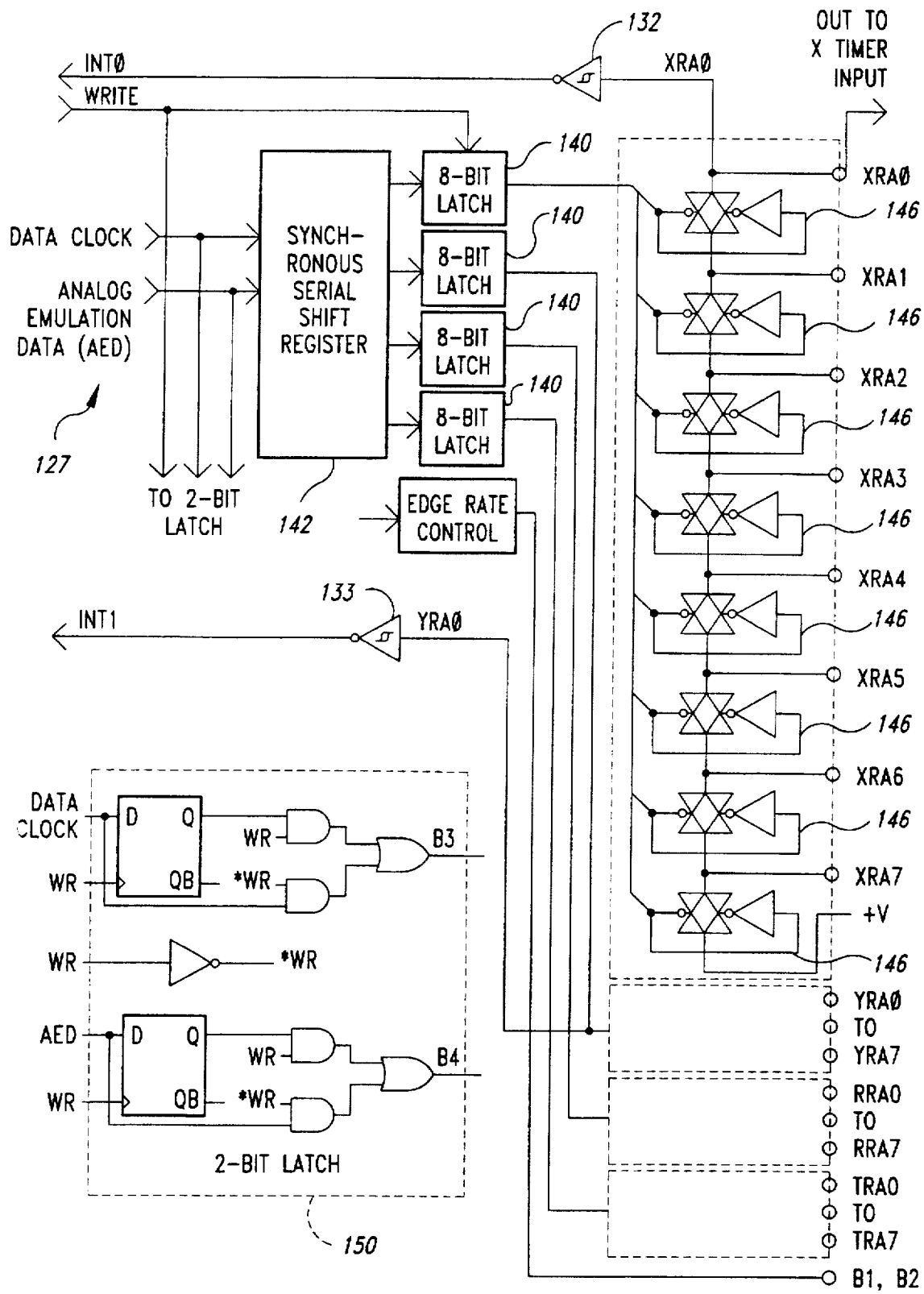
FIG. 3D is a functional block diagram of a programmable resistor application specific integrated circuit of FIG. 3C.

As best illustrated in FIG. 3D, which is a functional block diagram of the ASIC 126, the ASIC is a four-channel CMOS integrated circuit that drives attached loads as if it were a set of four programmable resistors tied to the power supply (+V). Each channel has an 8-bit data latch 140. The data latches 140 are loaded simultaneously from a 32-bit shift register 142 via a synchronous serial interface. The analog emulation data (AED) is synchronously transferred over the ASIC data lines 127 into the serial shift register 142 using the data clock. A write line (WR) in the ASIC data lines 127 is used to strobe the data from the synchronous serial shift register 142 into each of the corresponding data latches 140. The data latches 140 set the state of a series of CMOS analog switches illustrated for the X position with the reference numeral 146. Each channel consists of 8 CMOS switches 146, connected in series, and 8 external resistors in the RLX resistor ladder network, each in parallel with a CMOS switch. The CMOS switches 146 adjust the resistance of each channel in 256 (i.e., 28) steps by turning on or off.

Figure 3E:
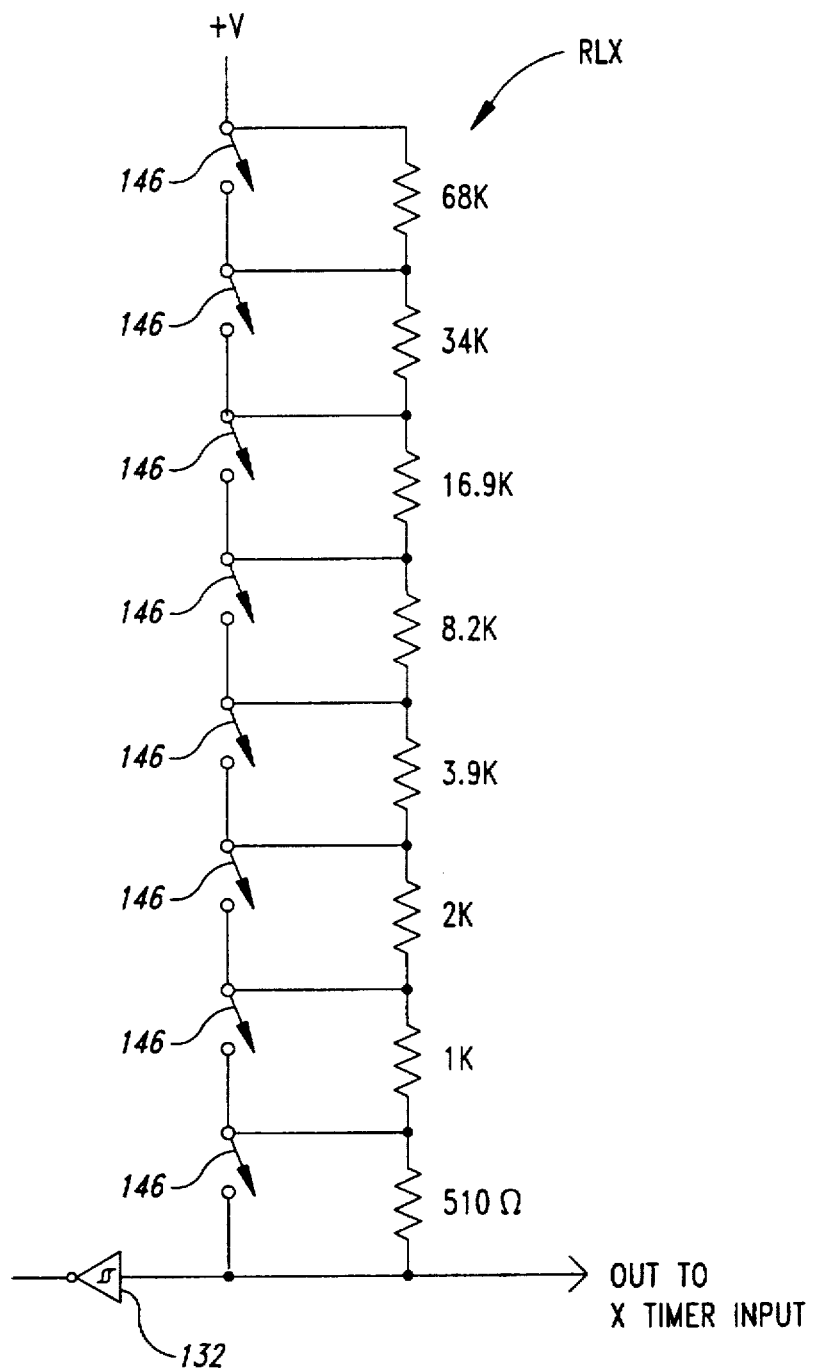
FIG. 3E illustrates a programmable resistor ladder used by the application specific integrated circuit of FIG. 3D.

When a bit in one of the data latches 140 is set to a high logic level, the corresponding CMOS switch 146 is "OFF," and when the bit in the data latch is a low logic level, the corresponding CMOS switch 146 is "ON." The resistor ladder network and CMOS switches 146 are illustrated in the functional diagram of FIG. 3E wherein each CMOS switch 146 is illustrated as a simple SPST switch. As can be seen in FIG. 3E, if the CMOS switch 146 is OFF (i.e., open), corresponding to a high logic level in the corresponding bit in the data latch 140, the resistance across the CMOS switch is included in the total resistance value. If the CMOS switch 146 is ON (i.e., closed), corresponding to a low logic level in the corresponding bit in the data latch 140, the resistance across the CMOS switch is shorted out and thus does not contribute to the total resistance value. The output (OUT) of the resistor ladder network RLX is coupled to the timer input 20 of the X timer 14. As illustrated in FIG. 3E, all CMOS switches 146 are open and thus the resistance between +V and OUT is the sum of all of the resistance values. Using the resistor ladder networks RLX, RLY, RLR, and RLW, the ASIC 126 can emulate resistance values across a broad range and thus provide the timer inputs 20 with the appropriate resistance corresponding to the X, Y, and R positions of the control stick 108 and the position of the slidable member 111. It should be noted that the specific resistance values illustrated in FIG. 3E are provided as examples only. Those skilled in the art will readily recognize that other resistance values can be readily substituted for those illustrated in the Example of FIG. 3E.

Figure 5:
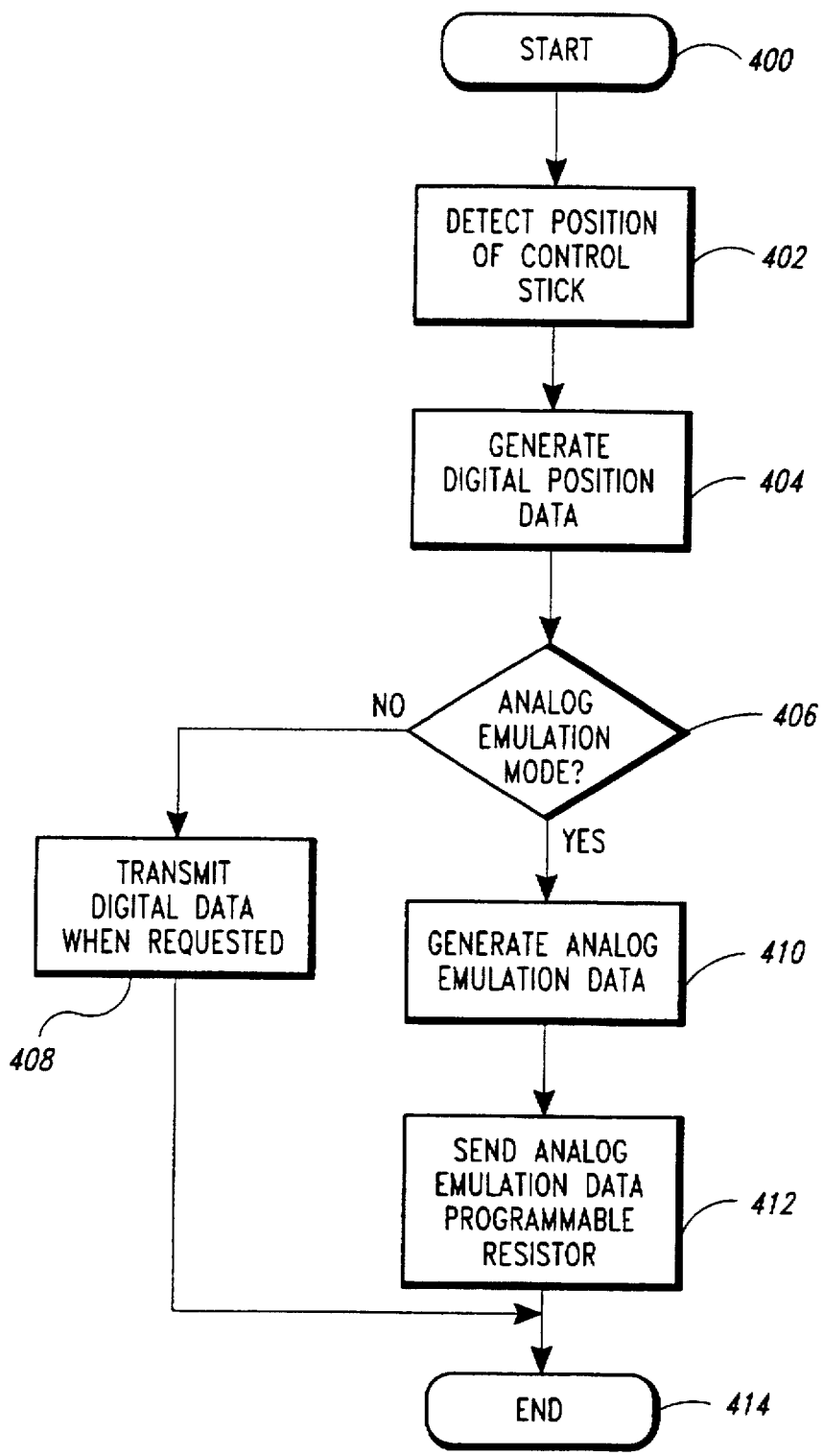
FIG. 5 is a flow chart used by the system of FIG. 3A to emulate a conventional joystick.

The flowchart of FIG. 5 illustrates the steps taken by the digital joystick 102 to emulate the conventional joystick 10. The digital joystick 102 begins the process at the start 400. In step 402, the position sensing circuit 106 (see FIG. 3C) detects the position of the control stick 108. In step 404, the microprocessor 124 generates digital position data corresponding to the position of the control stick 108, as well as the position of the slidable member 111. In decision 406, the digital joystick 102 determines whether it is operating in the Analog Emulation Mode 302 (see FIG. 4). If the digital joystick 102 is not operating in the Analog Emulation Mode 302, the result of decision 406 is NO. In that event, in step 408, the digital joystick 102 transmits digital position data directly to the digital port 18 in response to the Send Data command from the game port 12.

If the digital joystick 102 is in the Analog Emulation Mode, the result of decision 406 is YES. In that event, in step 410, the microprocessor 124 generates analog emulation data corresponding to the X, Y, and R positions of the control stick 108, as well as the position of the slidable member 111. As previously discussed, the microprocessor 124 can generate the analog emulation data in a number of ways, such as by using Equation (1), a look-up table (not shown), or the like. In step 412, the microprocessor 124 sends the Analog Emulation Data to the ASIC 126. Following the completion of step 412, the digital joystick 102 ends the analog emulation in step 414. As those skilled in the art will readily recognize, this process is repeated continuously by the digital joystick 102.

Figure 3F:
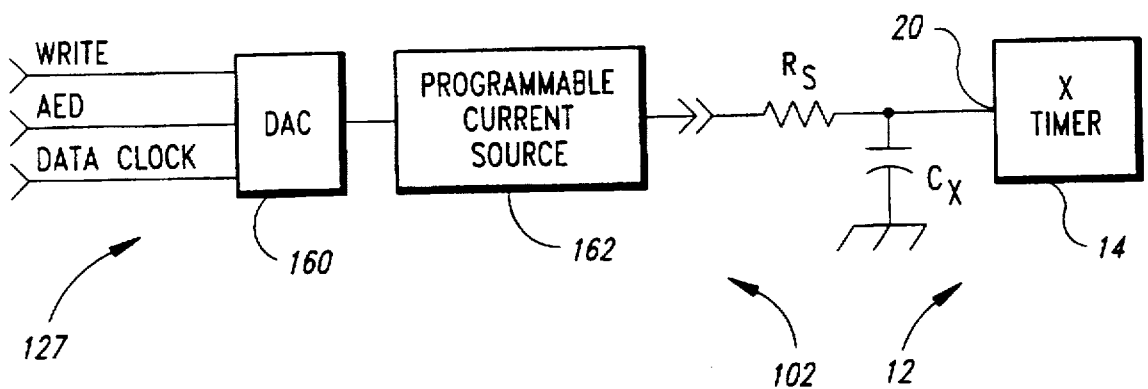
FIG. 3F illustrates an alternative to the application specific integrated circuit of FIG. 3D.
Figure 3G:
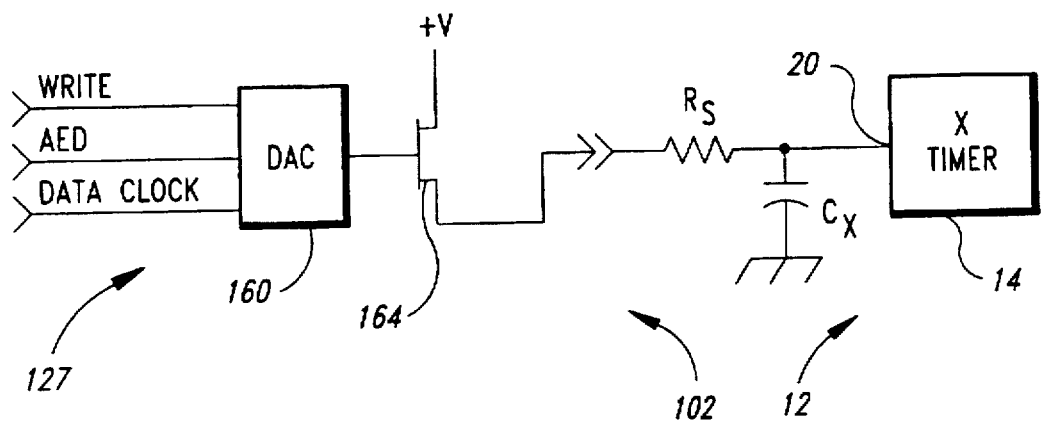
FIG. 3G illustrates another alternative to the application specific integrated circuit of FIG. 3D.

While the ASIC 126 provides a simple way of emulating resistance values, those of skill in the art can appreciate that alternative techniques may also be used to emulate resistance values. For example, the ASIC 126 could be replaced with a digital to analog converter (DAC) 160 and a programmable current source 162, as shown in FIG. 3F for an alternative embodiment. The DAC 160 converts the analog emulation data from the microprocessor 124 to a control voltage which in turn controls the current supplied by the programmable current source 162. The programmable current source output is a variable current that charges the capacitor $C_X$ coupled to the timer input 20 of the X timer 14 in the game port 12. Thus, the actual resistances may be replaced with the programmable current source 162. Similarly, programmable current sources 162 are coupled to the timer input 20 of the Y timer 16, the R timer 17 and the W timer 19 to emulate those resistances.

The DAC 160 may also be coupled to a programmable impedance 164 in place of the programmable current source 162. In its simplest form, the programmable impedance 164 comprises a single MOSFET transistor whose impedance is controlled by the data voltage, which is coupled to the output of the DAC 160. The programmable impedance thus charges the capacitor $C_x$ at the same rate as would the X potentiometer in the conventional joystick 10.

Figure 3H:
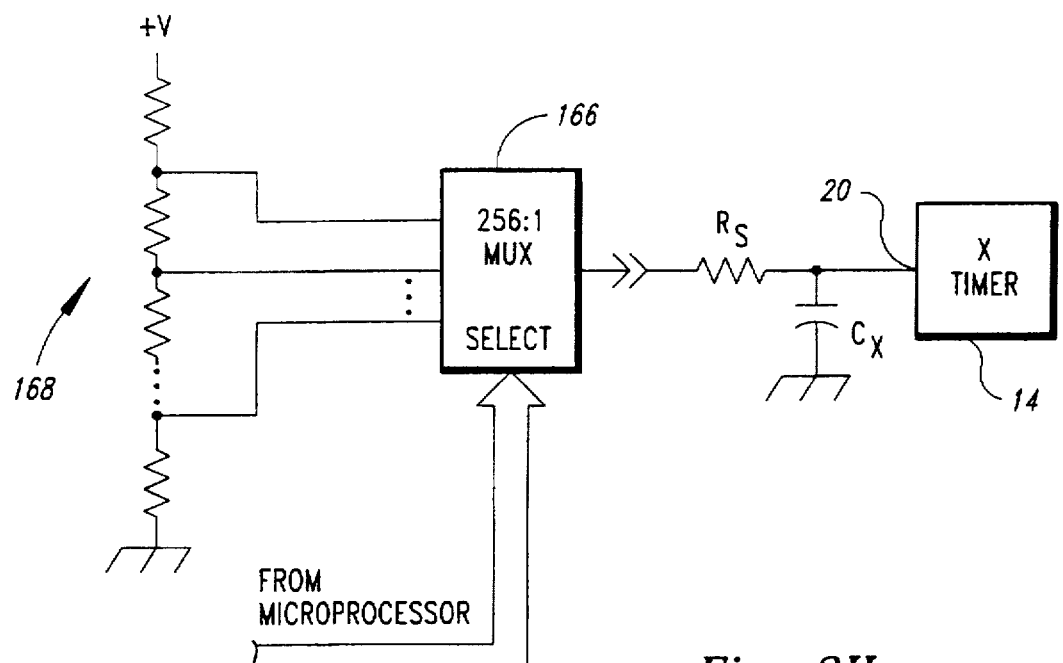
FIG. 3H illustrates another alternative to the application-specific integrated circuit of FIG. 3D.

In yet another alternative embodiment, the ASIC 126 is replaced by a 256:1 multiplexer 166 and a plurality of resistors 168, as shown in FIG. 3H for another alternative embodiment. The ASIC data lines 127 are replaced with select lines 170 to couple one or more of the resistors 168 to the timer input 20 of the X timer 14. The same principles are applied to the timer inputs 20 of the Y timer 16, the R timer 17 and the W timer 19.

As previously discussed, the conventional joystick 10 (see FIG. 1) is an input device only, and cannot receive data from the computer 1 via the game port 12. In contrast, the system 100 utilizes the signal on the timer input 20 to generate interrupt requests for the microprocessor 124 and thus communicates in a limited bidirectional fashion with the digital joystick 102. While the following discussion is centered around the use of the X timer 14, corresponding to the X direction, those skilled in the art will appreciate that the Y timer 16 could also be used by the system 100. However, for the sake of simplicity, the present application will discuss the use of the X timer 14.

As previously discussed, the timer input 20 of the X timer 14 is reset to 0 volts at time $T_2$ (see FIG. 2) in response to OUT, 201H instruction to the game port 12. However, the digital joystick 102 replaces the X potentiometer with a fixed resistance value in the resistor ladder network RLX (see FIG. 3C) such that the elapsed time between periods $T_2$ and $T_3$ in FIG. 2 is fixed. In the presently preferred embodiment, the resistor ladder network RLX is programmed to have a fixed value of approximately 30 KΩ. Using the formula of Equation (1), the X timer 14 will generate a pulse of approximately 354.2 μsec. A resistance value greater than 30 KΩ may be used to provide a greater pulse width.

Returning again to FIG. 3C, the ASIC 126 includes first and second inverters 132 and 133, respectively, which may be Schmitt trigger inverters for better noise immunity. The resistor ladder network RLX OUT and the timer input 20 of the X timer 14 are also coupled to the input of the first inverter 132, as shown in FIG. 3D. When the signal on the timer input 20 of the X timer 14 begins to charge to a high logic level, the output of the first inverter 132 switches to a low logic level as the timer input passes the logic threshold for the first inverter. The output of the first inverter 132 is coupled to a first interrupt (INT0) input 134 on the microprocessor 124. Thus, a single interrupt request is generated for the microprocessor 124 in response to the OUT, 201H instruction to the game port 12. As will be described below, the game port 12 can send "commands" to the microprocessor 124 using one or more interrupts.

In response to the interrupt request at the INT0 input 134, the microprocessor 24 transmits a 64-bit data packet with data corresponding to the X, Y, and R positions of the control stick 108 and the position of the slidable member 111, as well as the condition of the buttons 110. In the presently preferred embodiment, the digital joystick 102 transmits a 10-bit unsigned integer for the X position, representing the absolute position of the control stick 108 in the X direction. Similarly, the digital joystick 102 transmits a 10-bit unsigned integer for the Y position, representing the absolute position of the control stick 108 in the Y direction. The digital joystick 102 also transmits a 10-bit unsigned integer for the position of the slidable member 111. The R position of the control stick 108 is represented by a 9-bit unsigned integer.

The digital joystick 102 also transmits 8-bits, corresponding to eight of the twelve physical buttons 110, respectively. In addition to the eight buttons 110, the digital joystick 102 includes a hat switch button 110A having four internal switches operable by a single button. The hat switch button 110A can activate a single switch corresponding to UP, DOWN, LEFT, and RIGHT. In addition, the hat switch button 110A can be positioned at a diagonal to simultaneously activate two switches. For example, the hat switch button could be moved diagonally to activate the UP switch and the RIGHT switch simultaneously. The digital joystick 102 encodes eight possible positions of the hat switch button 110A, corresponding to 45-degree intervals (i.e., UP, UP-RIGHT, RIGHT, DOWN-RIGHT, DOWN, DOWN-LEFT, LEFT, and UP-LEFT), and transmits four encoded hat switch button data bits as part of the 64-bit data packet. A single mode data bit is also included in the 64-bit data packet.

Figure 3I:
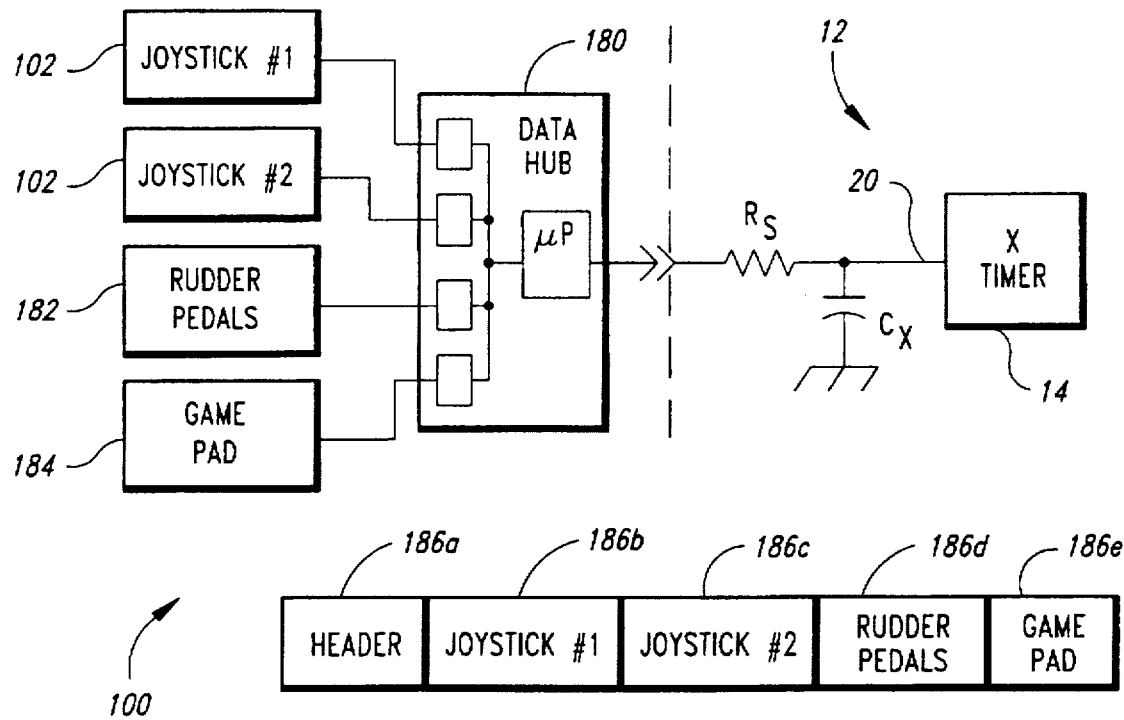
FIG. 3I illustrates a data hub used by the system of FIG. 3A to concentrate data from a plurality of positional control devices.

The mode data bit indicates whether the digital joystick 102 is operating in the Digital Transmission Mode 300 (see FIG. 4) or in the Analog Emulation Mode 302 as well as the type of conventional joystick 10 being emulated if in the Analog Emulation Mode. The 64-bit data packet also includes a 4-bit checksum of each nibble for all 8 bytes transmitted by the digital joystick 102. The total checksum, including the nibble checksum, should equal zero. The computer 1 (see FIG. 1A) uses the checksum in a conventional manner to detect errors in the transmission of the 64-bit data packet. Other well-known forms of error detection could also be used. It should be noted that the 64-bit data packet is presented herein as one example of the system 100. However, different lengths for the data packet can also be used. For example, the system 100 may include a data hub 180, illustrated in FIG. 3I to which a number of positional control devices may be connected. The data hub 180 may be an independent device, or a part of the digital joystick 102 (see FIG. 3A). In the example illustrated in FIG. 3I, the data hub 180 is coupled to two digital joysticks 102, rudder pedals 182, and a game pad 184. Each of the positional control devices generates position data that is transferred to the data hub 180. In response to the Send Data command from the game port 12, the data hub 180 transmits a digital data packet that includes positional control data from each of the positional control devices. As illustrated in FIG. 3I, the data hub 180 transmits a digital packet 186 comprising a data header 186A followed by data from each of the positional control devices. Data portions 186B and 186C contain positional data from each of the digital joysticks 102, respectively. Data portion 186D contains position data from the rudder pedals 182, while data portion 186E contains data from the game pad 184. Thus, the digital data packet 186 is not limited merely to a 64-bit data packet as illustrated in the example with one digital joystick 102.

The 64-bit data packet is transferred from the joystick 102 to the computer 1 through the digital port 18, which is normally used to sense the position of buttons B1 and B2 (see FIG. 1B) on the conventional joystick 10. The system 100 uses the two button inputs, corresponding to bits 4 and 5 of input port 201H, as a serial data input and a serial clock input, respectively. As will be discussed below, the serial data is synchronously transferred using the serial clock. The microprocessor 124 contains conventional I/O ports (not shown) to couple the serial data and the serial clock to the digital port 18.

Figure 6A:
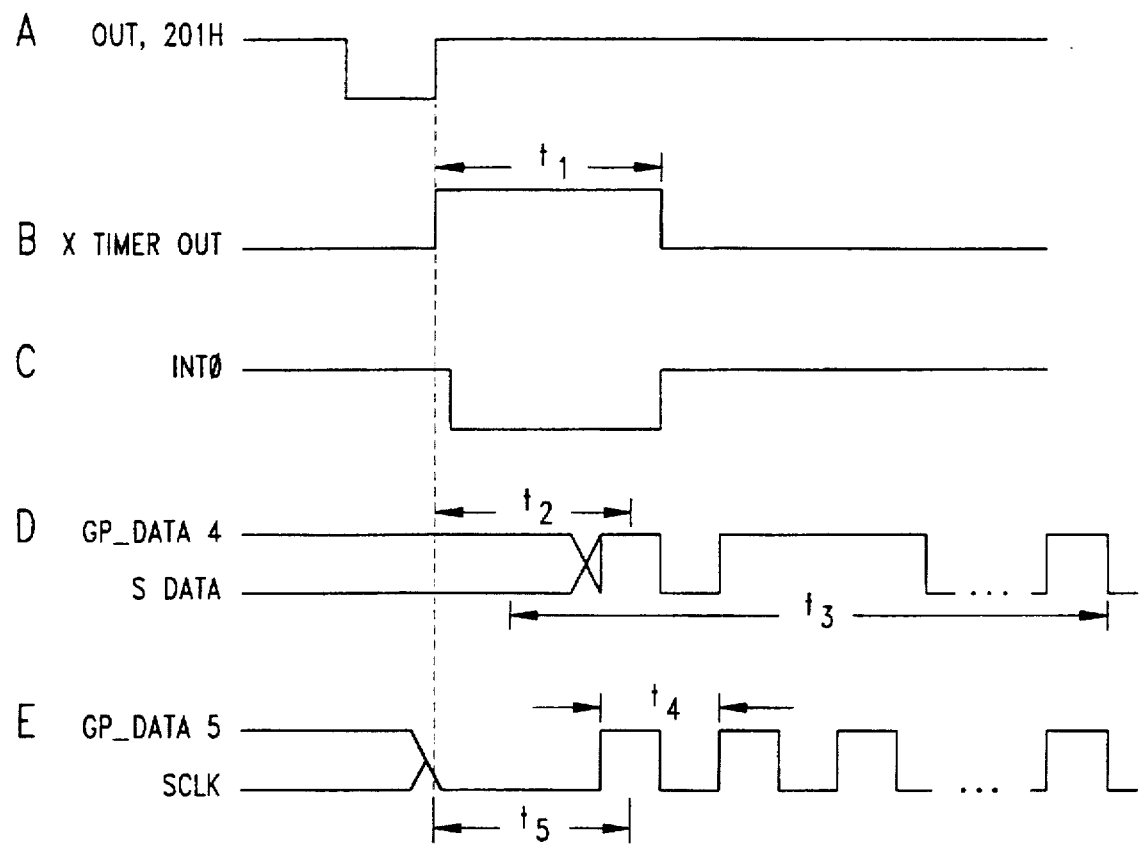
FIG. 6A is a waveform timing diagram used by the system of FIG. 3A.

FIG. 6A illustrates waveform timing diagrams of the system 100. Instructions in the computer software cause the CPU 2 to generate the OUT, 201H instruction to the game port 12, which is interpreted by the digital joystick as the Send Data command. Waveform A illustrates the OUT, 201H instruction. Waveform B illustrates the output of the X timer 14, which is bit 0 of input port 201H (see FIG. 3A). The output of the X timer 14 is set to a high logic level in response to the OUT, 201H instruction. Time period $t_1$ is the pulse width of the X timer 14 using the timing capacitor $C_X$ and the fixed resistance value for the resistor ladder network RLX (see FIG. 3C). Waveform C illustrates the INT0 input 134, which changes logic states in response to the capacitor $C_X$ at the timer input 20 charging above the logic threshold of the first inverter 132.

In response to the interrupt request, the microprocessor 124 transmits the 64-bit data packet containing the digital position data and switch position data. Waveform D illustrates the transmission of the 64-bit data packet. Time period $t_2$ is the delay time from the interrupt request to the midpoint of the first bit of the 64-bit data packet when the data bit is valid. As will be discussed in greater detail below, the 64-bit data packet is dynamically configured for transmission serially using one of the button input lines on the digital port 18, or in parallel to two or more button input lines on the digital port. Waveform E illustrates the serial clock generated by the microprocessor 124 (see FIG. 3C) to control the data transfer from the digital joystick 102 to the game port 12. The serial data of waveform D is synchronously transferred to the digital port 18 (see FIG. 3A) with the serial clock of waveform E. Each bit of the 64-bit data packet is valid on the rising edge of the serial clock. The computer software within the computer 1 (see FIG. 1A) uses the serial clock to read the 64-bit data packet. Techniques used by the computer software to read the serial data and the synchronous serial clock are well known and need not be described herein. Time period $t_3$ is the total data packet transmission time for the 64-bit data packet. In the presently preferred embodiment, the total data packet transmission time period $t_3$, for the 64-bit data packet is approximately 710 μsec. This assumes a data transfer rate of 100,000 bits per second (100 Kbits/second). Data is transferred in 8 bytes of data, each having 8 data bits. There is approximately 1 μsec delay between successive data bytes. Time period $t_4$ is the time to transfer a single bit at 100 Kbits/second. Time period $t_5$ is the delay from the rising edge of the OUT, 201H instruction to the rising edge of the serial clock, indicating a valid data bit. Those of ordinary skill in the art will appreciate that different data transfer rates will alter the time period discussed above, however, such variations are merely design choices and do not affect the scope of the invention.

Figure 6B:
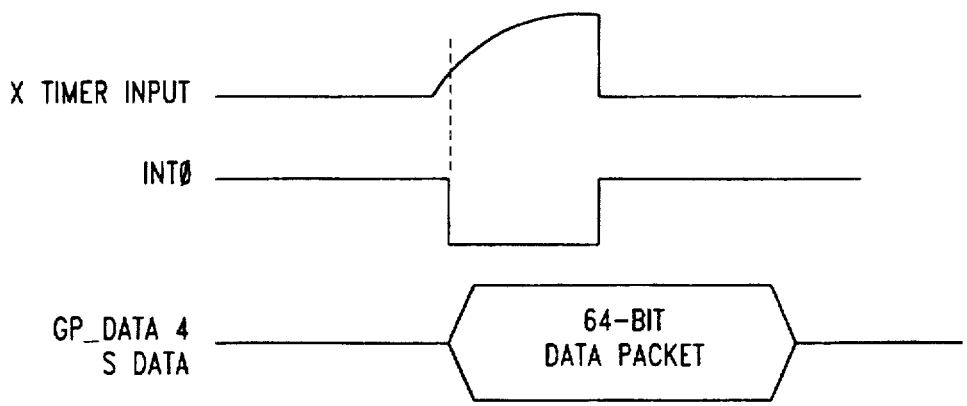
FIG. 6B is a waveform timing diagram used by the system of FIG. 3A in response to a first interrupt request.

The waveform timing diagram of FIG. 6B illustrates the total transmission time for the 64-bit data packet in response to the single interrupt request at the INT0 input 134 (see FIG. 3A). Thus, the game port 12 can communicate with the digital joystick 102 by generating the interrupt request. The first interrupt request is interpreted by the digital joystick 102 as the Send Data command. In response to the Send Data command, the digital joystick 102 transmits the 64-bit data packet with digital position data and button data, as described above.

Figure 7:
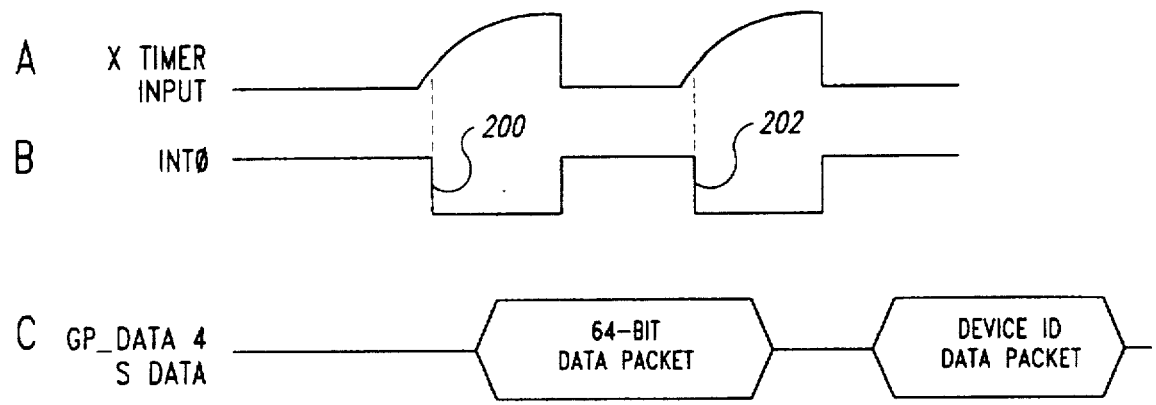
FIG. 7 is a waveform timing diagram used by the system of FIG. 3A in response to a second interrupt request.

To send an additional command to the digital joystick 102, the game port 12 transmits an additional OUT, 201H command while the microprocessor 124 is processing the first interrupt request. This is illustrated by the waveform diagram of FIG. 7 where a timer input 20 of the X timer 14 is shown in waveform A. As the timer input charges, the output of the inverter 132 (see FIG. 3A) changes logic levels generating a first interrupt request at the INT0 input 134. In response to the first interrupt request 200, the microprocessor 124 (see FIG. 3A) transmits the 64-bit data packet, shown in waveform C, in the manner described above.

Waveform B also includes a second interrupt request 202 that is generated by the inverter 132 in response to the additional OUT, 201H command. The second interrupt request 202 must occur while the microprocessor 124 is transmitting the 64-bit data packet.

In response to the second interrupt request 202, INT0 input 134 is again set to a low logic level. The microprocessor 124 interprets the second interrupt request 202 as the Send ID command. In response to the Send ID command, the microprocessor 124 transmits a device identification (ID) data packet. The device ID data packet includes data identifying the manufacturer of the digital joystick 102, the model number and serial number of the particular digital joystick, and the version of the firmware used to operate the microprocessor 124. Those skilled in the art will understand that other forms of information can also be included in the digital identification data packet.

The game port 12 can send additional commands to the digital joystick 102 by transmitting an additional interrupt request to the INT0 input 134 while the microprocessor 124 is processing the previous interrupt request. Using the data transfer rates described above and the pulse width generated by the timing capacitor $C_X$ (see FIG. 3A) and the resistor ladder network RLX, the system 100 can include up to eight commands. The pulse width generated by the X timer 14 limits the number of commands because the timer cannot be retriggered until the timer output is reset to zero, which occurs at the end of the time delay period. The data transfer rate limits the number of commands because interrupts must occur during the processing of the previous command. For example, the second interrupt must occur while the digital joystick 102 is transmitting the 64-bit data packet in response to the first interrupt request. As those of ordinary skill in the art can readily appreciate, different data transfer rates, and a different pulse width for the X timer 14 can be used to permit a different number of commands.

Figure 8:
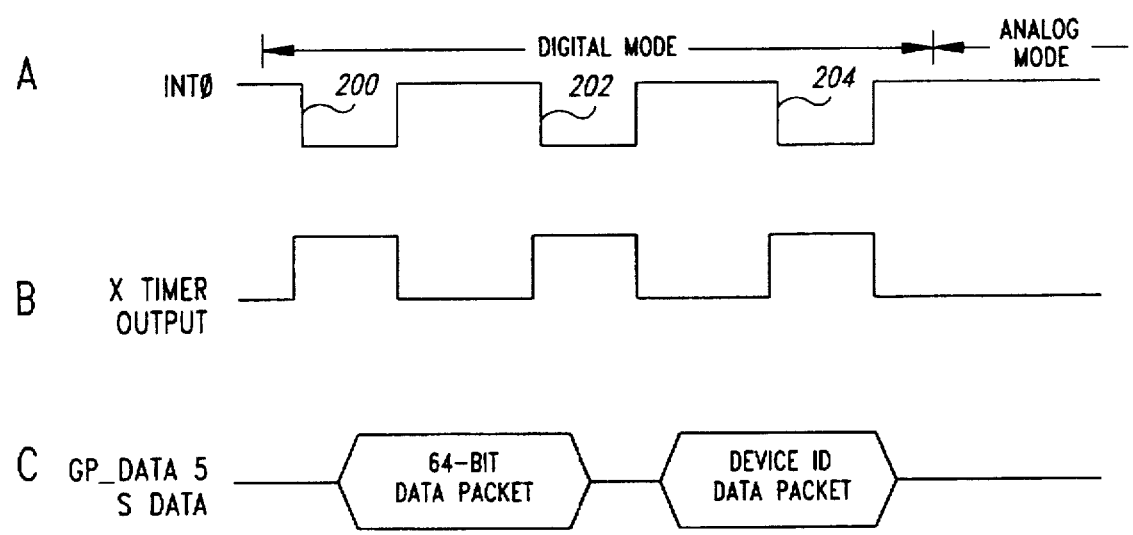
FIG. 8 is a waveform timing diagram of the system of FIG. 3A in response to a third interrupt request.

In the presently preferred embodiment of the digital joystick 102, only three commands are used. As seen in FIG. 8, the Send Data command is transmitted from the game port 12 to the digital joystick using the first interrupt request 200, as shown in waveform A of FIG. 8. The second interrupt request 202 is interpreted by the digital joystick 102 as the Send Device ID command. A third interrupt request 204, generated while the microprocessor 124 is transmitting the device ID data packet, is interpreted by the digital joystick 102 as a "Switch to Analog" command to switch the digital joystick into the Analog Emulation Mode 302 (see FIG. 4). Waveform A of FIG. 8 shows the waveform at the INT0 input 134 of the microprocessor 124. Waveform B in FIG. 8 illustrates the output of the X timer 14 (i.e., Bit 0, IN, 201H) in response to the sequence of OUT, 201H commands. Waveform C in FIG. 8 illustrates the transmission of the 64-bit position data packet in response to the first interrupt request 200 and the transmission of the device ID data packet in response to the second interrupt request 202. The digital joystick 102 does not transmit any additional data to the game port 12 in response to the third interrupt request 204. Rather, the digital joystick 102 switches from the Digital Transmission Mode 300 (see FIG. 4) to the Analog Emulation Mode 302.

It should be noted that the use of the three commands illustrated above are presented as examples of the inventive bidirectional communication system for use with the digital joystick 102. As those skilled in the art can readily appreciate, other commands to the digital joystick 102 can be used. Furthermore, the digital joystick 102 could be replaced with a different peripheral device (not shown), such as the data hub 180 (see FIG. 3H), and the principles of the present invention used to communicate with that peripheral device in a manner determined by the nature of the peripheral device itself.

As previously discussed, the digital joystick 102 of the system 100 can operate in the Digital Transmission Mode 300 or the Analog Emulation Mode 302 (see FIG. 4). The digital joystick 102 is placed in the Analog Emulation Mode 302 by transmitting the three interrupt requests 200, 202, and 204 (see FIG. 8) to the INT0 input 134 of the microprocessor 124 in the manner previously described. In addition, the system 100 can send a "Switch to Digital" command to the digital joystick 102 to change from the Analog Emulation Mode 302 to the Digital Transmission Mode 300.

Figure 9:
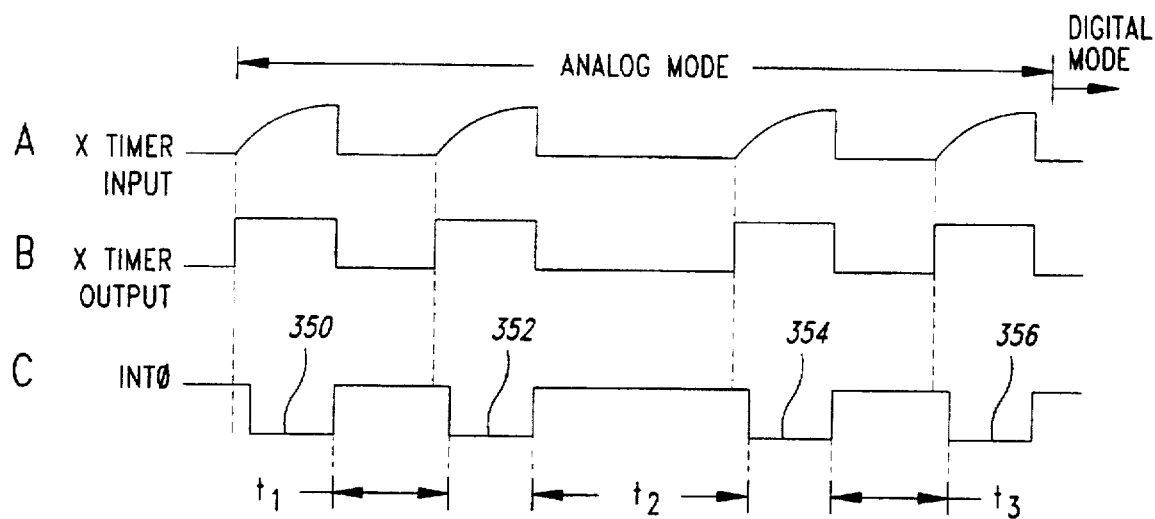
FIG. 9 is a waveform timing diagram of the system of FIG. 3A when changing from an Analog Emulation Mode to a Digital Transmission Mode.

The game port 12 causes the digital joystick 102 to change from the Analog Emulation Mode 302 to the Digital Transmission Mode 300 using a series of interrupt requests to the digital joystick. In response to the predetermined sequence of interrupt requests, the digital joystick 102 changes from the Analog Idle state 324 (see FIG. 4) to the Go Digital state 332. FIG. 9 illustrates the waveforms used to generate the Switch to Digital command. Waveform A of FIG. 9 illustrates the timer input 20 of the X timer 14 in response to a series of OUT, 201H commands from the game port 12 (see FIG. 3A). As previously discussed, the output of the X timer 14 remains high for a period of time dependent on the value of the timing capacitor $C_X$ and the emulation resistance value from the RLX resistor ladder network in the ASIC 126 (see FIG. 3C) as illustrated in waveform B of FIG. 9. Waveform C illustrates a series of four interrupt requests that are coupled to the INT0 input 134 (see FIG. 3C) of the microprocessor 124 while the digital joystick 102 is in the Analog Emulation Mode 302 (see FIG. 4). The digital joystick 102 interprets the series of four interrupt requests, having a predetermined time relationship, as the Switch to Digital command to change from the Analog Idle state 324 to the Go Digital state 332 and thus return to the Digital Transmission Mode 300. A first analog mode interrupt request 350 is processed as a normal interrupt in which position data is requested by the computer software.

When the INT0 input 134 returns to a high logic level, a second analog mode interrupt request 352 must be generated within a predetermined period of time $t_1$, as shown in FIG. 9. In the presently preferred embodiment, the second analog mode interrupt request 352 must occur between 115 μsec and 305 μsec of the time at which the INT0 input 134 (see FIG. 3C) returned to a low logic level. If the second analog mode interrupt request 352 does not occur within this time frame, there is no valid Switch to Digital command and the second analog mode interrupt request is merely treated as another request for position data. If the second analog mode interrupt request 352 does occur within the required time frame, the microprocessor 124 records the precise time $t_1$ and stores the time, designated as $t_v$. When the INT0 input 134 returns to a high logic level, a third analog mode interrupt request 354 must be generated with a predetermined period of time $t_2$. When the INT0 input 134 returns to a high logic level, a fourth analog mode interrupt request 356 must be generated within a predetermined period of time $t_3$ as shown in FIG. 9. The time periods $t_1$, $t_2$ and $t_3$ are all different time periods to prevent the accidental transition of the digital joystick 102 from the Analog Emulation Mode 302 to the Digital Transmission Mode 300 by computer software programs. As stated above, the time period $t_1$ is designated as $t_v$ only if it is greater than 115 μsec and less than 305 μsec. The time periods $t_2$ and $t_3$ must satisfy the equations below:

$$t_v+697 \text{ μsec}<t_2<t_v+755 \text{ μsec} \quad (2)$$

$$t_v+288 \text{ μsec}<t_3<t_v+312 \text{ μsec} \quad (3)$$

such that all three time periods $t_1$, $t_2$, and $t_3$ must be within specified ranges. If the four analog mode interrupt requests 350, 352, 354, and 356 do have the specified timing relationship, the digital joystick 102 switches from the Analog Emulation Mode 302 (see FIG. 4) to the Digital Transmission Mode 300. Thus, the system 100 can effectively send commands to the digital joystick 102 in either the Digital Transmission Mode 300 or the Analog Emulation Mode 302 (see FIG. 4).

Returning briefly to FIG. 3C, the microprocessor 124 transmits serial data from the digital joystick 102 to the button input lines on the digital port 18 of the game port 12, as previously described. However, the conventional game port connector 22 (see FIG. 1B) permits the simultaneous connection of two conventional joysticks 10. While the connector 22 permits the simultaneous connection of two conventional joysticks 10, not all game ports 12 include the necessary electrical circuitry to enable the use of two conventional joysticks 10. The system 100 automatically tests the game port 12 for the presence of electrical circuitry for a second joystick (not shown) and dynamically configures the data from the microprocessor 124 to be transmitted serially over a single data line if the game port 12 has the electrical circuitry for one joystick 10, or configures the data packet to transmit data in parallel if the game port 12 has the electrical circuitry for two joysticks.

Figure 10:
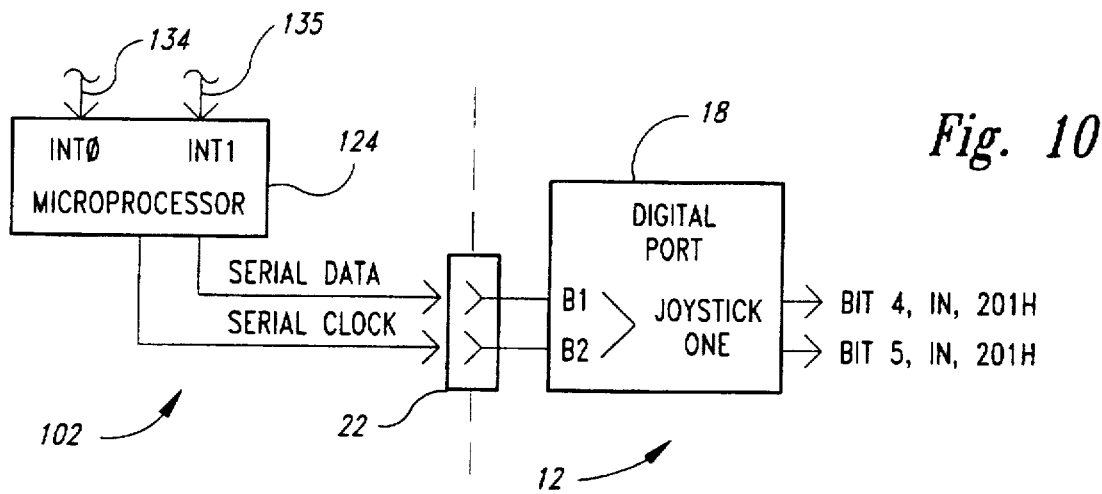
FIG. 10 is a functional block diagram of the system of FIG. 3A in which data has been dynamically configured for transmission over a single data line.

FIG. 10 is a simplified version of FIG. 3C and shows only the microprocessor 124, the digital port 18, and the connector 22. FIG. 10 illustrates the data configuration when the game port 12 has the electrical circuitry for only one joystick. As previously discussed, the serial data is transmitted from the microprocessor 124 into the input to the digital port 18 that is typically used for button B1 (see FIG. 1B). Similarly, the synchronous serial clock (see waveform E of FIG. 6A) from the microprocessor 124 is connected to the input on the digital port 18 typically used by button B2. The serial data and serial clock of the system 100 are read as bits 4 and 5, respectively, of IN, 201H.

Figure 11:
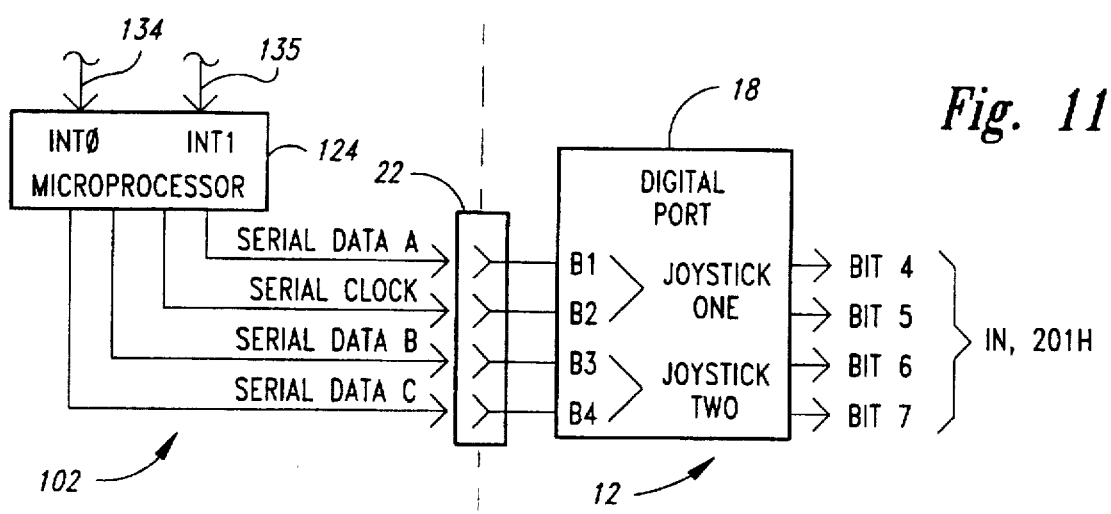
FIG. 11 is a functional block diagram of the system of FIG. 3A wherein the data has been dynamically configured for transmission over more than one data line.

FIG. 11 illustrates the dynamic data configuration if electrical circuitry for a second conventional joystick is present within the game port 12. As seen in FIG. 11, one button input line on the digital port 18 is used as a serial clock input, while the remaining three button input lines on the digital port are used for data inputs. As can be readily appreciated by those of ordinary skill in the art, data transmission rates are greatly increased by the use of additional data input lines. Thus, the data configuration illustrated by FIG. 11 is substantially faster than that illustrated by FIG. 10.

The system 100 tests for the presence of electrical circuitry for the second joystick in the game port 12 and automatically configures the data to take advantage of the presence of additional electrical circuitry for the second game port. To test for the presence of such electrical circuitry, the microprocessor 124 examines a second interrupt (INT1) input 135. The INT1 input 135 is coupled to the output of the second inverter 133 (see FIG. 3C) within the ASIC 126. The input of the second inverter 133 is, in turn, coupled to the timer input 20 corresponding to the X timer of the electrical circuitry for the second joystick in the game port 12 (illustrated in FIG. 3C as the R timer 17). As previously discussed, the timer input 20 of each timer 14, 16, 17, and 19 in the game port 12 is set substantially to 0 volts when the host computer 1 sends the OUT, 201H instruction to the game port 12. The microprocessor 124 interprets the interrupts at INT0 input 134 as commands, in the manner previously discussed. However, the microprocessor 124 also monitors the INT1 input 135 to determine whether the electrical circuitry for the second joystick is present. If the second joystick electrical circuitry is present, the INT1 input 135 will go to a low logic level. If there is no electrical circuitry for the second joystick in the game port 12, the INT1 input 135 will not change to a low logic level. In this manner, the digital joystick 102 can determine whether or not the second joystick electrical circuitry is present in the game port 12. If the game port 12 has the second joystick electrical circuitry, the digital joystick 102 dynamically configures the digital data to be transmitted to the button input lines for both the first and second joysticks in the digital port 18 as shown in FIG. 11. As those skilled in the art can appreciate, the INT1 input 135 may be an edge-triggered interrupt or a polled level signal. Thus, the microprocessor 124 may process the signal at the INT1 input 135 in a number of different ways. For example, the second inverter 133 may be eliminated and the microprocessor 124 programmed to pole the INT1 input 135 while the INT0 input 134 is at a low logic level. In this embodiment, the signal at the INT1 input 135 would be at a high logic level if the electrical circuitry for the second joystick is present in the game port 12. Therefore, the present invention is not limited by the specific form of the signal present at the INT1 input 135.

The computer 1 (see FIG. 3C) must also perform a task to determine whether the second joystick electrical circuitry is present in the game port 12. If the microprocessor 124 determines that the electrical circuitry for the second joystick is present, it nonetheless continues to transmit the 64-bit data packet only to the button inputs to the first joystick in response to Send Data commands from the game port 12 (see FIG. 3A). However, if the microprocessor 124 receives the Send ID command, the digital identification data is transmitted to the button inputs for the first joystick as previously described. In addition, the microprocessor 124 sends a predetermined code sequence to the button inputs for the second joystick after each byte of data is transmitted in the device ID data packet. In the present embodiment, the logic state of the button inputs for the second joystick are toggled following the transmission of each byte of the device ID data packet. The computer 1 monitors the data bits in the input port 201H corresponding to the second joystick (bits 6 and 7 of the input port 201H). If the predetermined code pattern is present during the transmission of the device ID data packet, the host computer recognizes that the electrical circuitry for the second joystick is present and that the digital joystick 102 will utilize all button inputs for subsequent data transmission. Following transmission of the device ID data packet, the digital joystick 102 configures data for transmission to the computer 1 in the manner illustrated in FIG. 11. In addition, the computer 1 is also configured to receive subsequent data transmissions from the digital joystick using the button inputs for both the first and second joystick inputs.

If the INT1 input 135 does not have the appropriate logic state, the digital joystick interprets this as an indication that the electrical circuitry for the second joystick is not present in the game port. In this event, the digital joystick 102 will not transmit the predetermined data pattern during transmission of the device ID data packet and will continue to configure data for transmission only to the two button inputs corresponding to the first joystick. In addition, the computer 1 will not detect the predetermined data pattern on bits 6 and 7 of the input port 201H, and will thus configure the game port 12 to receive subsequent data transmissions from the digital joystick 102 using only the button inputs corresponding to the first joystick. Thus, the system 100 automatically configures both the digital joystick 102 and the computer 1 for transmission of digital data through a single button input line on the digital port 18 of the game port 12 or through multiple button input lines on the game port without any intervention by the user.

As previously discussed, the digital joystick 102 transmits the 64-bit data packet, which includes the digital position data, button data, and error direction data. The digital position data that is coupled to the button input lines on the digital port 18 originates in the microprocessor 124 and the ASIC 126. As seen in FIG. 3C, the serial clock and data line A originate in the microprocessor 124 while data lines B and C originate in the ASIC 126. The ASIC 126 also includes a 2-bit latch 150, illustrated in FIG. 3D to provide additional button position data or part of the 64-bit data packet to the second joystick electrical circuitry. The 2-bit latch 150 has a latch mode in which data, such as additional button data, is latched in the Latch Buttons state 308 (see FIG. 4). The 2-bit latch 150 also has a transparent mode, in which data appearing on the input of the 2-bit latch 150 is mirrored on two output lines, which are button inputs 3 and 4 on the digital port 18. Alternatively, the microprocessor 124 could provide the additional data lines directly to the digital port 18, as illustrated in FIG. 11.

Figure 12:
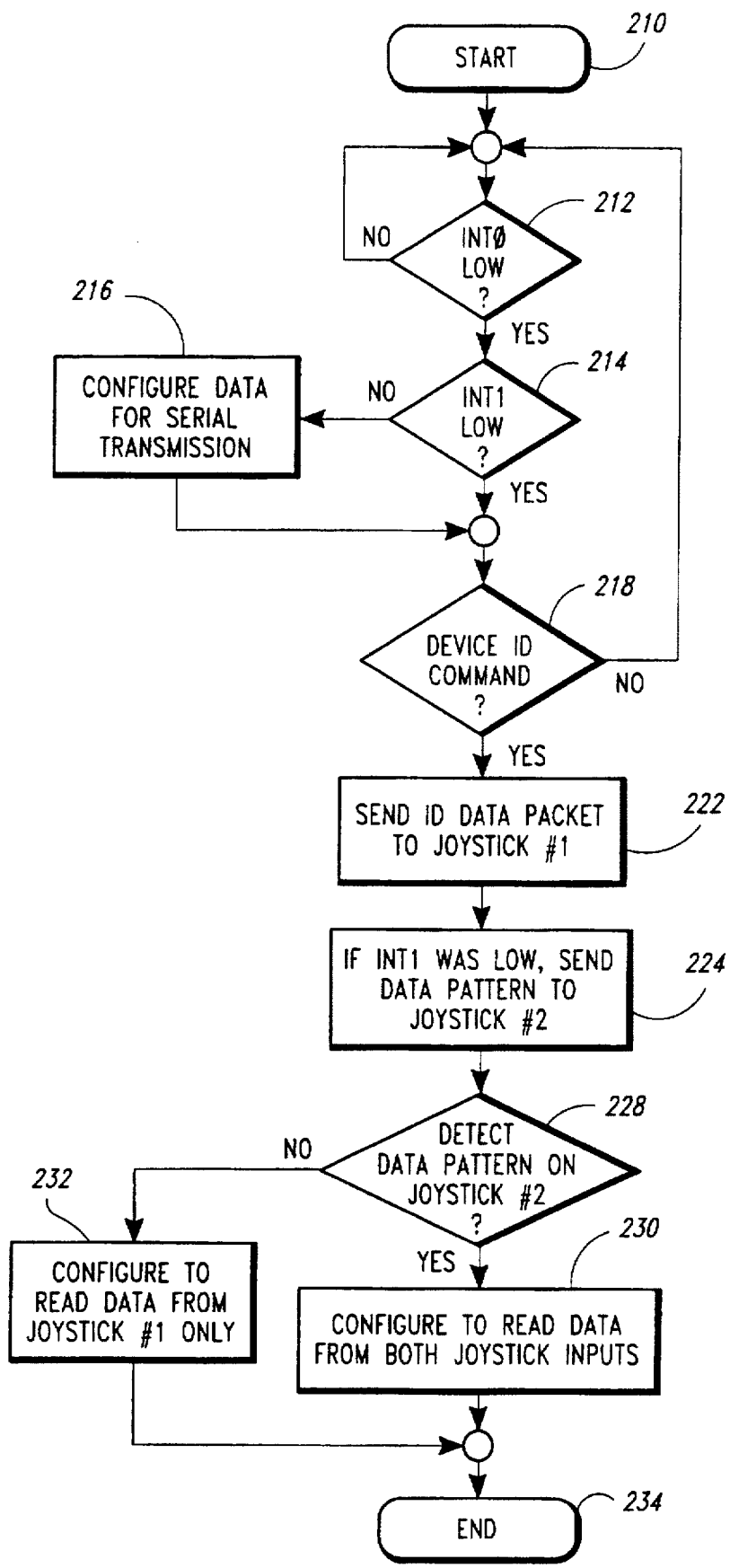
FIG. 12 is a flowchart of the steps taken by the system of FIG. 3A to dynamically configure data for transmission to a host computer incorporating the system of FIG. 3A.

The flowchart of FIG. 12 illustrates the steps taken by the system 100 to determine whether the second joystick electrical circuitry is present in the game port 12. At the start 210, the system 100 (see FIG. 3C) tests for the presence of second joystick electrical circuitry. In decision 212, the microprocessor 124 tests to determine whether the INT0 input 134 (see FIG. 3C) is at a high logic level. If the INT0 input 134 is not at a low logic level, the result of decision 212 is NO, and the system 100 loops back to decision 212. If the INT0 input 134 is at the low logic level, the result of decision 212 is YES. In that event, the microprocessor 124, in decision 214, tests whether the INT1 input 135 is also at the low logic level. As previously noted, a single OUT, 201H instruction to the game port 12 will cause all timers to start. If the game port 12 includes the second joystick electrical circuitry, the timer input 20 of the R timer 17 (see FIG. 3C) also charges at the same time as the timer input for the X timer 14. Thus, the INT0 input 134 and the INT1 input 135 will both be at a low logic level if the second joystick electrical circuitry is present in the game port 12. If the INT1 input 135 is not high, the result of decision 214 is NO. In that event, in step 216, the microprocessor 124 configures the data to be transmitted serially to the button 1 and button 2 input lines on the game port 12 with the data being transmitted to one of the two button input lines and the serial clock being transmitted to the other of the two button input lines. If the INT1 input 135 is high, the result of decision 214 is YES. In that event, the system 100 tests for the presence of the Send ID command in decision 218. If no Send ID command was transmitted from the game port 12 to the digital joystick 102, the result of decision 218 is NO. If the result of decision 218 is NO, the digital joystick 102 continues to transmit the 64-bit data packet in a serial fashion, as illustrated by FIG. 10. If the Send ID command has been transmitted from the game port 12 to the digital joystick 102, the result of decision 218 is YES. In that event, in step 222, the microprocessor 124 serially transmits the digital ID data packet to the two button input lines on the digital port 18 corresponding to the first joystick. However, as discussed above, the digital joystick 102 must also transmits the predetermined data position to the button inputs of the second joystick to permit the computer 1 to verify the presence of electrical circuitry for the second joystick in the game port 12.

The computer 1 tests for the presence of the second joystick electrical circuitry in the game port 12, as illustrated in the lower portion of the flowchart of FIG. 12. While the microprocessor 124 transmits the digital ID data packet in step 222, the microprocessor also transmits the predetermined data pattern to the button inputs (bits 5–6) of input port 201H) for the second joystick in step 224. In decision 228, the computer software within the computer 1 tests to detect the predetermined data pattern is present at the button inputs for the second joystick. If the predetermined data pattern is detected, the result of decision 228 is NO. In that event, in step 232, the computer 1 is configured to read the data transmitted serially only to the button 1 input line. If the data on the respective button input lines is identical, the result of decision 228 is YES. In that event, in step 230, the computer 1 is configured to read the data transmitted in parallel to the three button input lines with the remaining button input line being used for the serial clock. It should be noted that the process illustrated in the flowchart of FIG. 12 need not be repeated every time the INT0 input 134 (see FIG. 3a) changes to a low logic level. In practice, the digital joystick 102 tests for the presence of the electrical circuitry for the second joystick as part of an initialization routine when power is first applied to the digital joystick. As previously discussed, the digital joystick 102 continues to transmit data serially to the game port 12 (see FIG. 3a) until the device ID command is received by the digital joystick. The device ID command is typically transmitted by the computer 1 as part of an initialization routine for the game port 12. Thus, the configuration setup routine illustrated in FIG. 12 is performed only one time. Following the completion of step 230 or step 232, the system ends the configuration setup at step 234. Subsequent data transmissions from the microprocessor 124 to the digital port 18 are configured to conform with the electrical circuitry present in the game port 12. Alternatively, the computer 1 can configure the digital joystick 102 to have the desired configuration for data transmission by sending bidirectional commands to the digital joystick using a sequence of interrupts in the manner previously described.

Thus, the system 100 takes advantage of the presence of electrical circuitry for the second joystick in the game port 12 to reduce the overall data transmission time. While the specific embodiment illustrated in FIGS. 10 and 11 utilize a serial clock and three serial data lines, those of ordinary skill in the art can readily appreciate that other types of dynamic data configuration are possible. For example, two serial clocks could be used and the remaining two inputs to the digital port 18 could all be used to transmit data. In addition, those of ordinary skill in the art can appreciate that the specific data connections to the digital port 18 are merely a matter of design choice and could be readily altered. For example, the serial clock and the data lines could be reversed.

Figure 13:
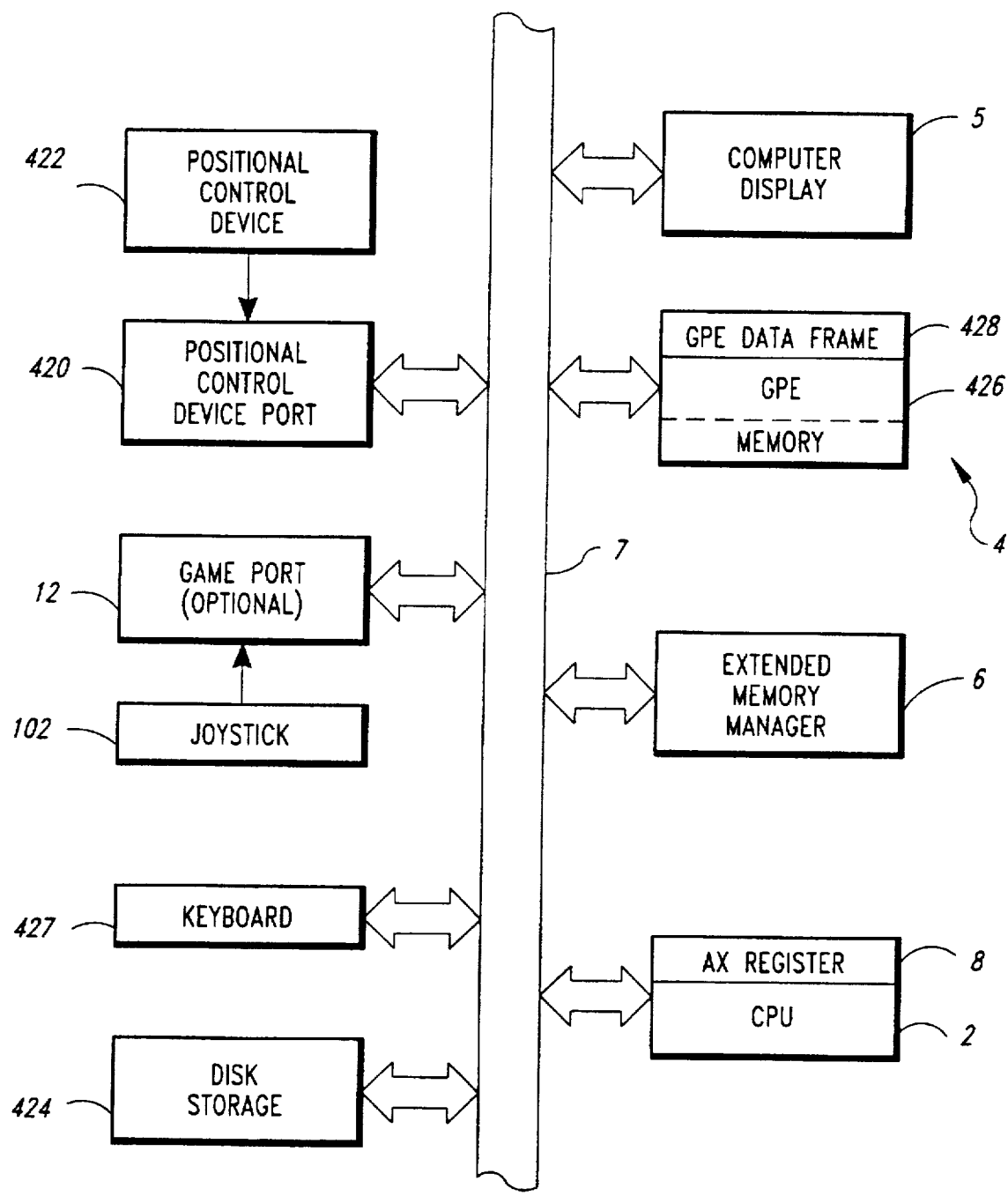
FIG. 13 is a functional block diagram of the host computer incorporating the system of FIG. 3A.

As has been described above, the digital joystick 102 (see FIG. 3A) of the system 100 is capable of operation with the conventional game port 12 and can respond to commands from the game port. Furthermore, the digital joystick 102 can emulate the conventional joystick 10 (see FIG. 1B) with emulated resistances to maintain backward compatibility with existing computer software. In yet another aspect of the invention, the system 100 can accept position data from a variety of data sources, and will use the data from a user selected data source to emulate the data from the conventional joystick 10. In this embodiment, the system 100 can even emulate the game port 12 itself. This is best illustrated in FIG. 13 where the computer 1 has a control device port 420 coupled to a positional control device 422, such as a mouse, trackball, light pen, or the like. Alternatively, the position data may come from a disk storage unit 424, such as a disk drive. Designating the disk storage unit 424 as the data source advantageously permits the user to record positional data on the disk storage unit and to subsequently replay the exact positional data. In this embodiment of the invention, the host computer 1 may not include the game port 12. A game port emulator (GPE) 426 resides in a portion of the memory 4 and allows the user to select the source of cursor position data that will be used to emulate the conventional joystick 10. The user can select any data source to provide position data. The GPE 426 determines the position data using the data from the user selected data source. The GPE 426 subsequently emulates data from the game port 12 by substituting its own data into the AX register 8 in response to input requests from the computer software. The manner in which the GPE 426 substitutes its own data will be described in detail below.

The positional control device 422 selected by the user provides position data to the system 100 through the positional control device port 420 in a conventional manner. The cursor position data is delivered to the system 100 which formats the data into a predetermined form and delivers the formatted data to a GPE data frame 428, which is typically part of the memory 4. The GPE data frame 428 will be described in greater detail below. The GPE data frame 428 contains position data from the positional control device 422, as well as data regarding the status of buttons (not shown) on the positional control device. The GPE data frame 428 receives and stores position data from a plurality of different data sources. The only requirement for any data source is that it must provide data translatable into position data. In addition, the data source may provide button data. The system 100 can select any of the plurality of data sources by taking position data from selected portions of the GPE data frame 428. Thus, the system 100 provides the further advantage of having flexibility in the selection of the data source, and can switch freely between data sources. The user can select the data source for each of the four degrees of freedom of the digital joystick 102. For example, the X and Y position data could be provided by the conventional joystick 10 (see FIG. 1B) while the R position data is provided by a mouse (not shown). The data from the user selected positional control device 422 is formatted in a unique manner in the GPE data frame 428 to permit its use in emulating the data from the conventional joystick 10.

Figure 14:
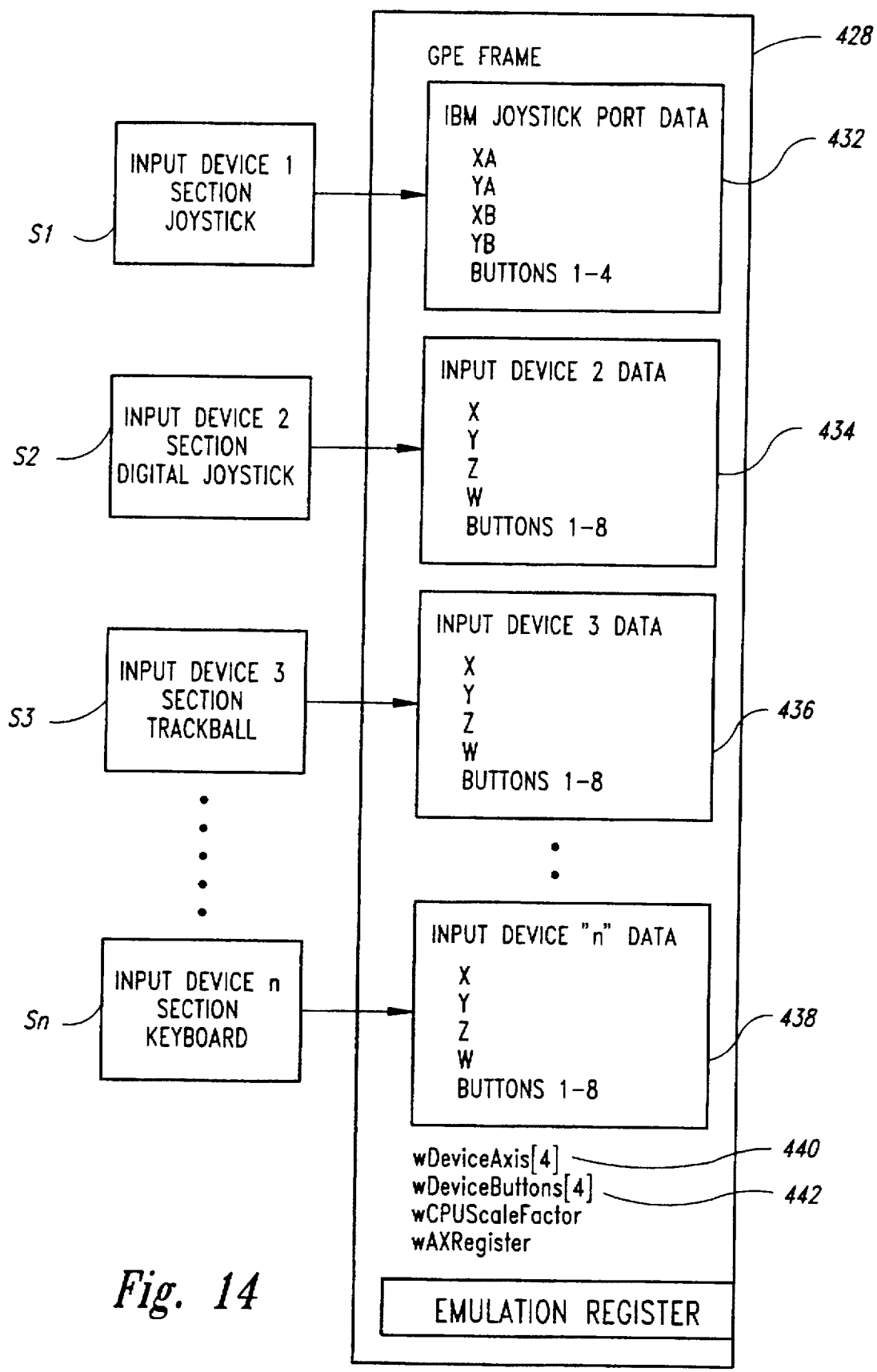
FIG. 14 illustrates the game port emulator data frame used by the system of FIG. 3A.

The GPE data frame 428 has a predetermined format illustrated in FIG. 14. The system 100 permits the user to define a plurality of data sources, illustrated in FIG. 14 as input devices S1–Sn. Each data source provides position data or button data to the GPE data frame 428. The GPE 426 takes the data from the user selected data source(s) and converts the data to a form usable by the computer software. As a default section, the conventional joystick 10 (see FIG. 1B) provides position data in the conventional manner previously described. Each input device has position data and may have button data that are placed in predetermined locations within the GPE data frame 428. The GPE 426 of the system 100 is provided with a memory index 440 to point to the location within the GPE data frame 428 where data for each of the user selected data sources can be found. For example, the user may select the digital joystick 102 to provide the X and Y position data, a trackball pointing device (not shown) to provide R position data, as well as position data corresponding to the slidable member 111, and a keyboard 427 (see FIG. 13) to provide button inputs. In this example, the memory index 440, the index provides a pointer to the data source for each of the four degrees of freedom of the digital joystick 102 as well as the data source for the buttons 110.

Each of the input devices provides position data and button data to the GPE data frame 428. As illustrated in FIG. 14, the conventional joystick 10 is designated as input device S1 and provides position data and button data to a portion 432 of the GPE data frame 428. Input device S2 is shown, by way of example, as the digital joystick 102. The position data and button data from the digital joystick 102 are stored in a portion 434 of the GPE data frame 428. Similarly, input device S3 is illustrated in FIG. 14 as a trackball pointing device. Data from the trackball pointing device, which includes both position data and button data is stored in a portion 436 of the GPE data frame 428. In similar fashion, input device number Sn is designated as the keyboard 427 (see FIG. 13). Cursor position data, such as data from arrow buttons on the keyboard 427, and button data is stored in a portion 438 of the GPE data frame 428.

In the example above, the user has selected the conventional digital joystick 102 as the data source for the X and Y position data. Thus, the memory index 440 for the X and Y position data sources would point to the X and Y data position locations within the portion 434 of the GPE data frame 428. Similarly, the memory index 440 for the remaining two degrees of freedom of the digital joystick 102 (i.e., the R position, and the position of the slidable member 111) points to the X and Y data input locations from the trackball pointing device (not shown), which are stored in the portion 436 of the GPE data frame 428. It should be noted that many pointing devices, such as the trackball pointing device, only have two directions of movement. Thus, the two directions of movement provided by the trackball are stored in the portion 436 of the GPE data frame 428 as X and Y position data. Other devices, such as a virtual reality helmet (not shown) may provide more directions of movement. Each of these directions of movement is stored in an appropriate location with the GPE data frame 428.

It should also be noted that not all data provided by each data source is utilized by the GPE 426. For example, each of the data sources provides position data, and many of the data sources will provide button data in addition to the position data. However, the GPE 426 only uses the data specified by the memory index 440. The digital joystick 102 provides X and Y and R position data, slidable member 111 position data, as well as button data, while the trackball pointing device (not shown) provides X and Y position data as well as button data. However, in the example illustrated above, the digital joystick 102 is used only to provide the X and Y position data, while the X and Y position data from the trackball pointing device is used to provide the R position data and the slidable member 111 position data, respectively. In the example above, the button data is provided by the keyboard 427 even though the conventional digital joystick 102 and the trackball pointing device (not shown) also provide button data inputs. Thus, each data source may provide more data than is utilized by the GPE 426.

The GPE data frame 428 also contains a button memory index 442, which provides a pointer to the portion of the GPE data frame that will be the data source for button data. In the example above, the keyboard 427 (see FIG. 13) is the user-selected data source for button data. In this example, the button memory index 442 provides a pointer to the portion 438 of the GPE data frame 428 containing the button data. Thus, the GPE data frame 428 of the system 100 may have each degree of freedom provided by an independent data source. The user can independently select the data source for each degree of movement, as described above. Those of ordinary skill in the art can appreciate that each data source provides position data and button data that can vary from one data source to another. For example, a conventional mouse (not shown) uses an optical encoder mechanism that provides a count corresponding to the movement of the mouse in two orthogonal directions. The count, typically measured in units designated as "mickeys" is converted by a conventional mouse driver (not shown) into X-Y position data corresponding to a cursor display position on the computer display 5 (see FIG. 14). The X-Y position data is placed in a portion (not shown) of the GPE data frame 428 for the mouse. The GPE 426 uses this data to determine the appropriate delay times for the X and Y timers 14 and 16 of the conventional joystick 10 and emulates the joystick delay times in the manner previously described. It should be noted that the game port 12 is not required if the user selects data sources other than the conventional joystick 10 and the digital joystick 102. Instead, the GPE 426 permits the user to select virtually any data source as the data source for each of the four degrees of freedom provided by the digital joystick 102. The system 100 receives the cursor position data and button data from the selected data source(s) and transforms the cursor position data into a corresponding emulation delay time. Furthermore, the buttons on the selected positional control device can be selected to correspond to buttons B1 and B2 on the conventional joystick 10 (see FIG. 1A). Thus, the present invention permits backward compatibility with existing computer game software using virtually any data source to emulate four degrees of freedom from any analog game port device.

The GPE 426 takes the cursor position data from the selected data source(s) and determines the corresponding delay times that would be produced by the X and Y timers 14 and 16 within the game port 12. Whenever any software on the computer 1 requests position data from the conventional joystick 10, the GPE 426 intercepts this request and substitutes its own delay time data from the selected data source(s). Thus, the GPE 426 substitutes its own data for that which would normally be read from the game port 12. The GPE 426 uses Equation (1) or the look-up table (not shown) in the memory 4 (see FIG. 1A) to determine the length of time that bits 0 and 1 of input port 201H must remain high to correspond to the X and Y positions respectively, of the control stick 108. The GPE 426 responds to input instructions (i.e., IN, 201H) to the game port 12 by placing its own data in the AX register 8 (see FIG. 1A) rather than data from the X and Y timers 14 and 16 (see FIG. 1B) However, steps must be taken to prevent the X and Y timers 14 and 16 (see FIG. 1B) in the conventional game port 12 from responding to I/O instructions from the CPU 2. Therefore, the GPE 426 intercepts the IN, 201H command so that the data from X and Y timers 14 and 16 in the game port 12 is not read by the computer 1. To perform this task, the system 100 detects and intercepts normal I/O instructions to the game port 12. The system 100 utilizes the memory management capability already within the computer 1 (see FIG. 1A) to detect and trap the desired I/O instructions.

As discussed above, advanced microprocessors use the extended memory manager 6 (see FIG. 1A) to address the memory 4 within the computer 1. The traditional use of I/O trapping by the extended memory manager 6 is to virtualize the I/O device among several virtual machines. For example, two software applications may use a serial port (not shown), and the extended memory manager 6 is used to arbitrate the use of the serial port to be shared between the two software application programs. The software application programs virtually function as if they each have a serial port. As part of its normal operation, the extended memory manager 6 traps I/O instructions and adds a segment address to generate a real memory address. The system 100 takes advantage of the I/O trapping mechanism of the extended memory manager 6 to insert data from the selected data source into the AX register 8 instead of merely virtualizing the game port 12. The operation of the extended memory manager 6 is well known to those of ordinary skill in the art of computer programming and need not be described in detail herein.

When the extended memory manager 6 intercepts any OUT, 201H instruction to the game port, the computer 1 is directed to the software of the GPE 426 residing within the memory 4. The GPE 426 interprets the OUT, 201H instruction as a command to get the X and Y position data from the conventional joystick 10. Instead, the GPE 426 selects the position data from the user selected data source in the GPE data frame 428 and calculates the delay times that would be generated by the X and Y timers 14 and 16 to correspond with the position data from the user selected data source in the GPE data frame. Whenever the extended memory manager 6 detects an IN, 201H instruction to the game port 12, the computer 1 is again directed to the GPE 426 within the memory 4. The GPE, having previously calculated the appropriate delay times for the X and Y timers 14 and 16, loads data bits 0 and 1 of the AX register 8 with the appropriate data values. If both X and Y timers 14 and 16 would be at a logical high value, the GPE 426 sets bits 0 and 1 of the AX register 8 to the high logic level. Thus, the computer software is made to believe that the joystick 10 is present on the computer 1 even if there is no conventional joystick 10 and even if there is no game port 12. In reality, the position data and button data is derived from the user selected data source and substituted in place of the data from the conventional joystick 10. This advantageously allows preexisting software, written for the conventional joystick 10, to operate with virtually any positional control device. It should be noted that the GPE 426 can derive cursor position data from the conventional joystick 10. For example, the conventional joystick 10 can be selected as the data source for the X-Y position data, while the R position data and the position of the slidable member 111 can be derived from another data source such as the trackball pointing device (not shown). Alternatively, if the digital joystick 102 (see FIG. 3A) has been selected by the user as the data source, the GPE 426 intercepts the OUT, 201H instruction and transmits the Send Data command to the digital joystick through the game port 12 in the manner previously described.

The system 100 receives the digital data from the digital joystick 102 and loads the position data and the button data into the portion 434 (see FIG. 14) of the GPE data frame 428. The GPE 426 then sets bits 0 and 1 in the AX register 8 (see FIG. 1A) to a high logic level to emulate the delay time response of the conventional joystick 10 (see FIG. 1B). Subsequent input instructions (i.e., IN, 201H) to the game port 12 are trapped by the extended memory manager 6. The GPE 426 will return a high logic level for bits 0 and 1 of the AX register 8 until the appropriate delay time is reached. Thereafter, the input request from port 201H will return a low value in the corresponding bit of the AX register 8. In this manner, any data source can transfer position data and button data to the computer 1. It should be noted that the computer software can read button inputs from the game port 12 without reading position data. If the GPE 426 is currently emulating the delay time periods of the X and Y timers 14 and 16 (see FIG. 1B), input instructions to the game port 12 will be processed in the conventional manner wherein the position data from the conventional joystick 10 and from the buttons B1 and B2 are read from the game port 12. However, if the GPE 426 is not currently emulating the delay times from the X and Y timers 14 and 16, input instructions to the game port will be taken directly from the input port. As previously discussed, the digital joystick 102 frequently updates the button data, which can be read without transmitting a Send Data command from the game port 12 to the digital joystick.

Figure 15A:
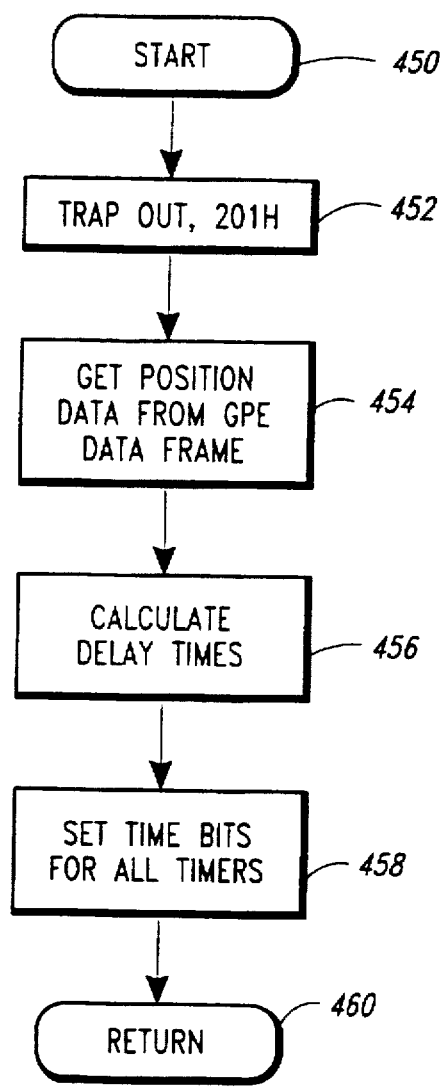
FIG. 15A is a flowchart used by the system of FIG. 3A to emulate a game port.
Figure 15B:
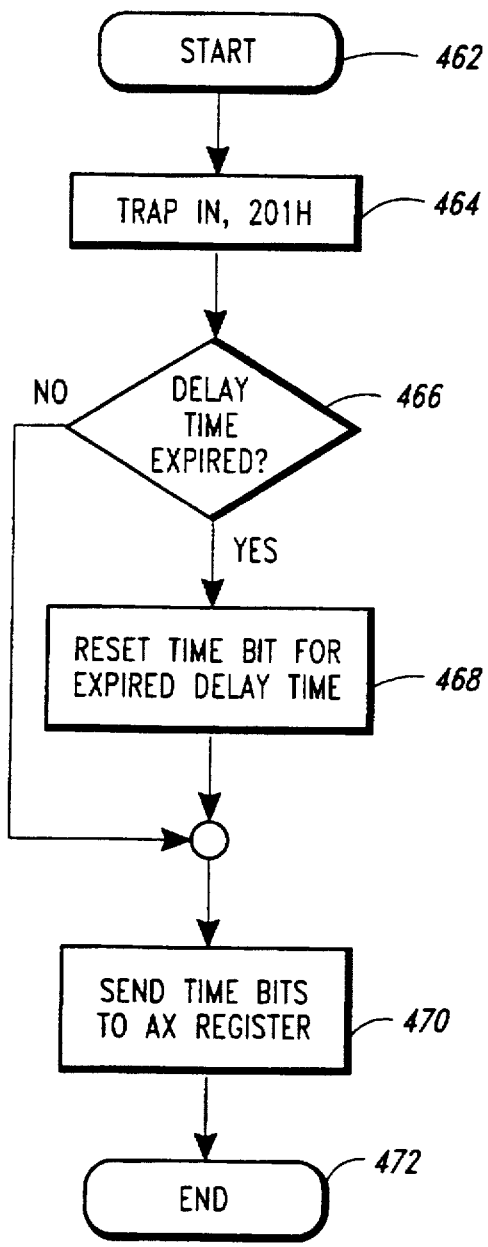
FIG. 15B is a continuation of the flowchart of FIG. 15A.

The operation of the GPE 426 to intercept I/O instructions is illustrated in the flowchart of FIGS. 15A and 15B. At the start 450, shown in FIG. 15A, the data sources have been selected for the position data and button data and the extended memory manager 6 (see FIG. 13) has been enabled for I/O trapping of the addresses for the game port 12. It should be noted that the examples presented herein utilize the industry standard addresses for the game port 12. However, the extended memory manager 6 is capable of trapping any I/O address. Therefore, the present invention is not limited by the specific I/O addresses used in these examples.

In step 452, the extended memory manager 6 detects an output instruction (e.g., OUT, 201H) to the game port 12 and jumps to a subroutine. In the subroutine, in step 454, the GPE 426 intercepts the OUT, 201H instruction and substitutes its own position data from the GPE data frame 428. It should be noted that if the digital joystick 102 has been selected as the data source, the GPE 426 generates the first interrupt 200 (see FIG. 8), which the digital joystick interprets as the Send Data command. As previously discussed, the digital joystick 102 transfers the 64-bit data packet to the game port in response to the Send Data command. The 64-bit data packet is used to update the GPE data frame 428. Other input devices, such as the trackball pointing device (not shown) periodically generate interrupts to the computer 1 to permit an update of position data. This updated cursor position data is also stored in the GPE data frame 428.

Within host computer 1, the system 100 takes the position data from the user selected data source and calculates the corresponding delay times in step 456. Alternatively, the system 100 can calculate the appropriate number of game port polls required to correspond to the position data, as previously described. In step 458, the system 100 sets timing bits for the position data. This includes the X, Y, and R position of the control stick 108, as well as the position of the slidable member 111 if all four degrees of freedom have selected data sources. The subroutine ends with a return 460.

The flowchart of FIG. 15b illustrates the steps taken in response to detecting an input instruction to the game port 12. At the start 462, the extended memory manager 6 (see FIG. 13) has been enabled to trap both input and output instructions to the game port 12, as described above. In step 464, the extended memory manager 6 has detected and trapped an input instruction to the game port 12. In that event, the system 100 executes a subroutine where, in decision 466, it determines whether any delay time has expired. If any delay time has expired, the result of decision 466 is YES. If the result of decision 466 is YES, the GPE 426, in step 468, resets the time bit for the corresponding expired delay time. It should be noted that more than one delay time may expire at the same time. In step 470, the GPE 426 sends the time bits to the AX register 8 (see FIG. 13), as previously described. If none of the delay times have expired, the result of decision 466 is NO. In that event, no time bits are reset, and the GPE 426 sends the time bits to the AX register 8 in step 470.

The computer software will continue polling the game port 12 by executing input instructions or measure the delay time by other alternative techniques, as previously discussed, until all time bits have been reset. The system 100 ends the delay time emulation process in step 472. Thus, the system 100 includes a digital joystick 102 that is capable of emulating an analog resistance value or digitally simulating the delay time. This advantageously permits the digital joystick 102 to maintain backward compatibility with existing computer software which was originally designed for operation with the conventional joystick 10 (see FIG. 1B). Alternatively, the computer software can read the 64-bit data packet directly to determine the position of the control stick 108, the slidable member 111, and the buttons 110.

As those skilled in the art can appreciate, the computer software on the computer 1 is often operating in a multi-tasking environment. If the computer 1 is using a system such as Windows®, the multi-tasking environment may cause timer jitter in the game port 12. The timer jitter results from variations in the time between input instructions to the game ports 12. For example, if the conventional joystick 10 is held in a fixed position by the user, the X timer 14 will produce an identical delay time for each position measurement period. Similarly, the Y timer 16 will produce an identical time delay each time a position measurement is initiated. However, as previously discussed in one example, the computer 1 determines the X and Y positions by determining the number of times that the AX register 8 is read before bits 0 and 1 in the AX register return to a low logic level. If the computer software is not operating in a multi-tasking environment, the polling loop used to input data from the game port 12 and to read the AX register will be constant. However, in a multi-tasking environment, such as the Windows® operating system, the time delay between input instructions to the game port and the polling loop may be variable. In such a case, a variable error value will be added to the true position values, making it appear that the conventional joystick 10 has moved when in actuality it has remained in a constant position. The result is perceived by the computer software as jitter in the conventional joystick 10. The GPE 426 (see FIG. 13) minimizes this apparent jitter by initiating its own X and Y position measurement sequence prior to performing the delay time emulation discussed above. This is particularly advantageous in reducing game port timer jitter for the conventional joystick 10, or the digital joystick 102 operating in the analog emulation mode 302 (see FIG. 4). When the GPE 426 initiates the X and Y position measurement process, it disables all interrupts and sits in a short timing loop to determine the position of the conventional joystick 10 or the control stick 108 of the digital joystick 102. Once the cursor position data has been obtained, the GPE 426 begins the time delay emulation. The net effect is that the time delay emulation becomes independent of the speed of the computer 1, as well as minimizing the error due to multitasking overhead.

As described above, the GPE 426 (See FIG. 13) permits the user to designate the data source for button as corresponding to buttons B1 or B2 of the conventional joystick 10 (see FIG. 1B). The conventional joystick 10 contains only two buttons (button B1 and button B2). However, many sophisticated computer games, or other application software, have a large number of commands that are not easily accommodated by the two buttons on the conventional joystick 10. Other joysticks have more than two buttons, but must use special encoding techniques to allow the computer 1 to detect the state of the additional buttons. In addition, the computer software in the computer 1 must be specially written to accommodate these special encoding techniques. Even when decoded, the extra buttons have a predefined meaning to the computer software and cannot be altered by the user. To enter additional commands, the user must often enter a command sequence on the keyboard 427 (see FIG. 13). For example, the Alt-Tab and Alt-Shift-Tab keys are often used in Windows®. For example, in the Flight Simulator® game, a particular sequence of keystrokes such as "Shift-F3-Enter." may have one meaning, however, the same keyboard sequence may have a different meaning to a different computer software program.

Some prior art solutions to this problem provide a hardware connection to both the game port 12 and the keyboard 427. The buttons B1 and B2 on the joystick 10 can be encoded for keyboard command sequences, but these keyboard command sequences are entered directly through the interface (not shown) for the keyboard 427. Furthermore, the user must manually load a configuration data file for each different computer software program to program the buttons B1 and B2 for each of the different computer software programs. The system 100 eliminates the need for the special hardware connection between the joystick and the keyboard by emulating keyboard commands. As described in detail below, the system 100 also automatically loads a data file relating the buttons 100 of the digital joystick 102 to user-selected keyboard command sequences.

The digital joystick 102 (see FIG. 3A) contains more than two buttons. The top hat button 110A at the top of the control stick 108 comprises four independent switches that are sensitive to the direction in which the user depresses the top hat button 110A. The GPE 426 (See FIG. 13) permits the user to define the buttons 110 as corresponding to user selected keyboard command sequences. For example, the user could designate a particular switch (not shown) in the top hat button 110A as corresponding to the Shift-F3-Enter command sequence for use in the Flight Simulator® game. However, the same switch (not shown) in the top hat button 110A could have a different keyboard command sequence for a different application software program. Thus, the user can independently define each of the buttons 110 in the digital joystick 102 as corresponding to a different keyboard command sequence for each application software program.

Figure 16:
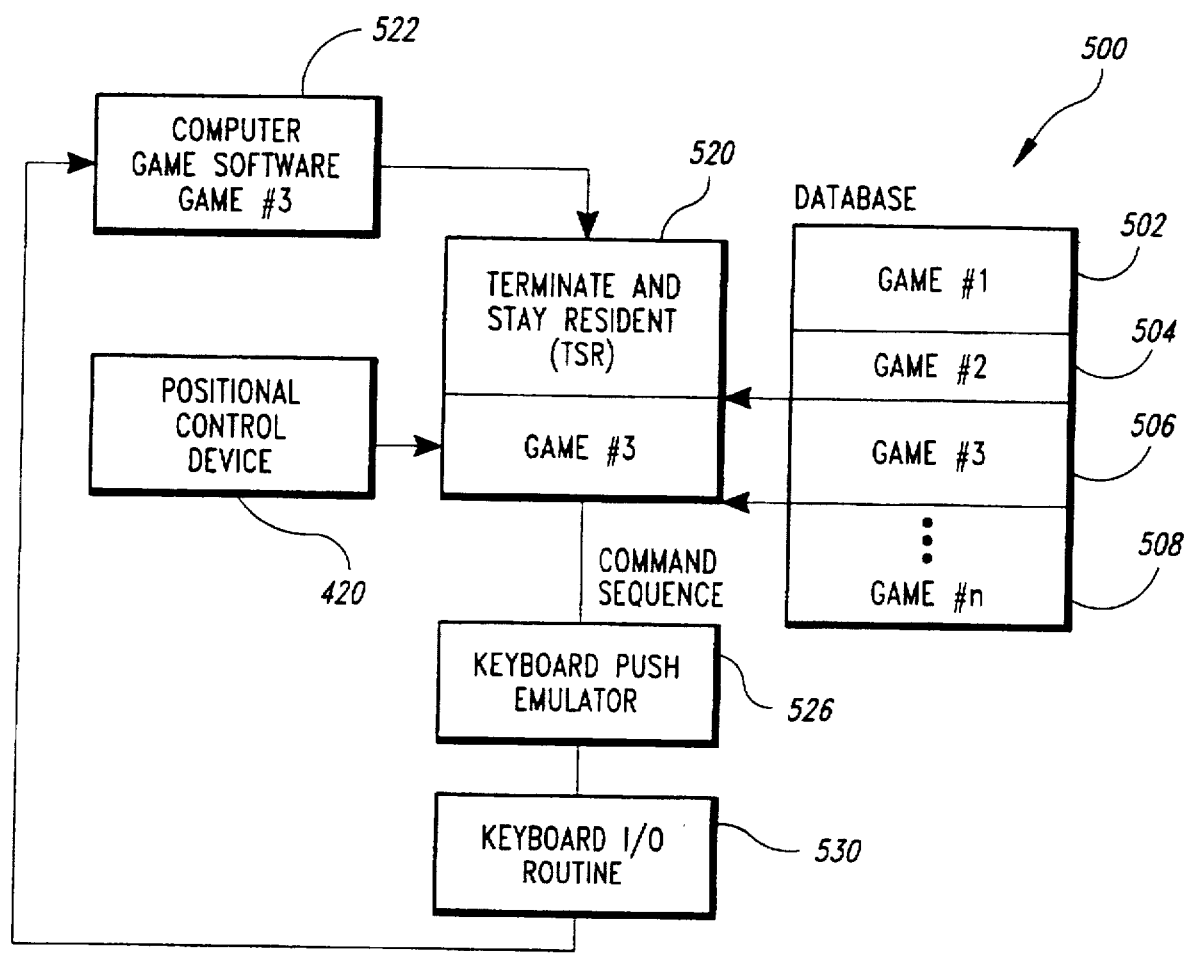
FIG. 16 is a functional block diagram of the system of FIG. 3A used to define the interrelationship of positional control device buttons and keyboard command sequences.

The interrelationships of the buttons 110 and the keyboard command sequences for each game are stored in a computer database 500, shown in FIG. 16. The database 500 may be part of the memory 4 (see FIG. 13) or part of the disk storage unit 424. The database 500 includes variable sized data portions whose size is dependent on the number of buttons 110 defined by the user, as well as the length of the user selected keyboard command sequences associated with each of the buttons. For example, a database portion 502 contains data to define the interrelationship of the buttons 110 and the keyboard command sequences for a first game. Similarly, database portion 504 contains data defining the interrelationship of the buttons 110 and the keyboard command sequences for a second game. It should be noted that while the examples presented herein relate to the buttons 110 of the digital joystick 102, those of ordinary skill in the art will appreciate that the data source selection aspect of the system 100 permits virtually any device to supply the button data. The keyboard command selection aspect of the system 100 permits the buttons of any data source to define the user selected keyboard command sequence. Furthermore, as previously discussed, the user can also select any data source for positional data.

The system 100 loads a terminate and stay resident (TSR) program 520, which is part of the memory 4. The TSR program 520 contains the software code to translate button data or positional data into emulated keyboard data. A selected portion of the database 500 is loaded as part of the TSR 520 when the user selects a particular game software for execution. For example, the computer software for a third game is initially in a storage location 522, such as the disk storage unit 424. The computer software is loaded from the storage location 522 into the memory 4. The TSR 520 accesses a database portion 506, which contains data defining the interrelationship of the buttons from the user selected data source and the user selected keyboard command sequences for the third game. The database portion 506 is loaded as part of the TSR 520. While operating the third game, any button selections on the positional control device 422 are translated by the TSR 520 into the appropriate user selected keyboard command sequence. The system 100 also includes a keyboard push emulator 526 which simulates the depression of the selected keyboard command sequence. The keyboard push emulator 526 will be described in greater detail below. A conventional keyboard I/O routine 530 reads the data supplied by the keyboard push emulator 526 and provides the simulated keyboard command sequences to the third game software. Thus, the keyboard push emulator 526 allows the user to predefine any button as corresponding to a user selected keyboard command sequence, thus simplifying the operation of the computer game software. While the examples presented herein are related to computer game software, those of ordinary skill in the art will readily recognize that the principles of the present invention related to the definition of keyboard command sequences and positional control device buttons are widely applicable to any form of computer software.

The keyboard push emulator 526 utilizes the I/O trapping mechanism of the extended memory manager 6 (see FIG. 13) to detect I/O instructions to the keyboard 427 and to generate keyboard interrupts, conventionally INT 9. For example, when the user depresses switch number three in the top hat button 110A of the digital joystick (see FIG. 3A), which is defined in the example above as corresponding to Shift-F3-Enter keyboard command sequence, the keyboard push emulator 526 places ASCII data corresponding to the Shift key into a keyboard input port (not shown) typically defined as I/O port 60H and generates INT 9 after the ASCII data corresponding to the Shift key has been entered into the keyboard register. The keyboard push emulator 526 repeats the sequence for ASCII data corresponding to the F1 button and the Enter button, respectively. Thus, the keyboard push emulator 526 can enter a complex, variable length keyboard command sequence in response to the detection of a single button push from the positional control device 422.

Figure 17:
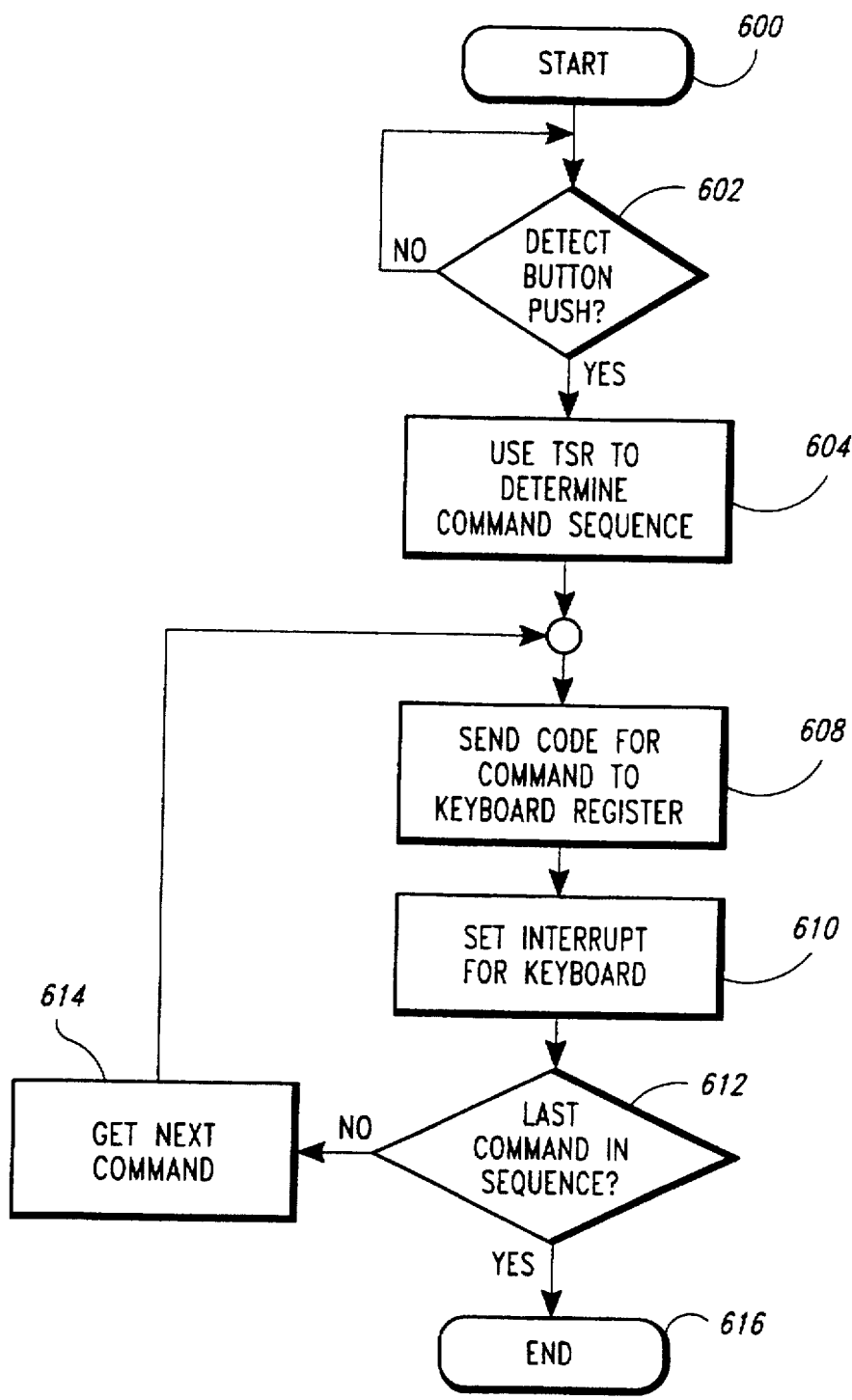
FIG. 17 is a flowchart illustrating the operation of the system of FIG. 3A.

The steps taken by the system 100 to emulate keyboard command sequences are illustrated in FIG. 17. At the start 600 the computer software has been loaded into the memory 4 (see FIG. 14) and the data base 500 has been loaded into the TSR 520. As discussed above, the data base information relates the individual buttons to user selected keyboard command sequences. In decision 602, the system 100 determines whether a button has been selected by the user. If no button has been selected by the user, the result of decision 602 is NO, and the system 100 loops back to the beginning of decision 602. If a button push has been detected, the result of decision 602 is YES. In that event, the system 100, in step 604, uses the TSR 520 (see FIG. 16) to determine the corresponding keyboard command sequence. In step 608, the TSR 520 sends the appropriate ASCII code for the command to the keyboard input port. In step 610, the system 100 sets the interrupt for the keyboard input port. In decision 612, the system 100 determines whether the command just sent to the keyboard input port is the last command in the keyboard command sequence. If the command is not the last keyboard in a keyboard command sequence, the result of decision 612 is NO. In that event, the system 100 gets the next command from the TSR 520 in step 614. The system 100 then repeats steps 608, 610, and decision 612 for each keyboard entry in the keyboard command sequence. When the last command in the sequence has been sent to the keyboard input port, the result of decision 612 is YES. In that event, the system 100 ends the keyboard command sequence emulation in step 616.

Thus, the system 100 provides sophisticated interface capability between the digital joystick 102 and the computer 1. The digital joystick 102 can transmit digital data through the game port 12, but also includes the Analog Emulation Mode 302 (see FIG. 4) to permit backwards compatibility with existing computer software. The system 100 further advantageously provides a game port emulator and permits the user to select any data source with which to emulate the conventional joystick 10. The system 100 further permits the user to define the interrelationship of buttons and positional data on the positional control device 422 and any user selected keyboard command sequence.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

What is claimed is:

1. A system to emulate operation of a game port having a predetermined input/output (I/O) address in a computer and having a data register containing a first status bit that is set to a first logic value by the conventional same port for a charging period of time determined by charging a capacitor in the conventional game port to a predetermined voltage level using a positional control device generating position data corresponding to a position of the positional control device, the system comprising:

- an instruction interceptor detecting instructions to the predetermined I/O address from a computer software program running on the computer, said instruction interceptor generating an interrupt vector in response to detecting an instruction from the computer software program to initiate a measurement cycle;
- a position calculator to receive the position data in response to said interrupt vector and to calculate a first time period based on the position data generated by the positional control device; and
- a controller to set the first status bit in the data register within the computer to the first logic level for the calculated first time period in response to said interrupt vector, said data register being read by said computer software program to determine the position of the positional control device based on said calculated first time period.

2. The system of claim 1, wherein said controller sets the first status bit to a second logic value upon expiration of said calculated first time period.

3. The system of claim 1 for use with a positional control device generating position data corresponding to a planar position of the position control device and having first and second coordinates corresponding to the planar position, the data register further including a second status bit, said position calculator calculating a second time period, said first and second time periods being based on the first and second coordinates of the planar position, respectively, said controller setting the second status bit in the data register to a third logic level for said calculated second time period.

4. The system of claim 1 for use with a computer responding to an interrupt wherein said position calculator disables the computer interrupt while receiving the generated position data from the positional control device.

5. The system of claim 1 wherein the positional control device is a joystick having a resistance based on the position of the joystick, said position calculator calculating said calculated first time period based on said resistance value.

6. The system of claim 1 for use with a plurality of positional control devices, each coupled to the computer and generating data corresponding to a position input of each of said plurality of positional control devices, the system further including a data source selector, operable by a user, to select one of the plurality of the positional control devices to generate said position data, whereby said position calculator calculates said calculated first time period based on the generated data from said user-selected positional control device.

7. The system of claim 1 for use with a plurality of positional control devices, each coupled to the computer and generating data corresponding to a position input of each of said plurality of positional control devices, the system further including a data source selector, operable by a user, to select at least a portion of the generated position data from each of the plurality of positional control devices as corresponding to a portion of the position data and said position calculator combining said selected portion of the generated data to calculate said first calculated first time period.

8. The system of claim 7, further including a plurality of memory locations wherein each of the plurality of positional control devices stores the generated data in a portion of said plurality of memory locations using a predetermined format, said data source selector including a plurality of memory pointers each indicating a particular location in said memory portion where said selected portions of the generated position data are stored.

9. A method for emulating operation of a conventional game port having a predetermined input/output (I/O) address in a computer using a positional control device generating position data corresponding to a planar position of the position control device and having first and second coordinates corresponding to the planar position, the conventional game port setting a first status bit in a data register to a first logic value for a charging period of time determined by charging a capacitor in the conventional game port to a predetermined level, the method comprising the steps of:

- detecting an I/O instruction to the predetermined I/O address from a computer software program running on the computer;
- in response to detecting said I/O instruction, retrieving the position data from the positional control device;
- calculating a first time period based on the position data generated by the positional control device;
- setting the first status bit in the data register to the first logic value for said calculated first time period;
- calculating a second time period, said calculated first and second time periods being based on the first and second coordinates of the planar position, respectively; and
- setting a second status bit in the data register to a third logic value for said calculated second time period.

10. A method for emulating operation of a port having a predetermined input/output (I/O) address in a computer using a plurality of positional control devices, each coupled to the computer and generating data corresponding to a position input of each of said plurality of positional control devices, and a plurality of memory locations wherein each of the plurality of positional control devices stores the generated position data in a portion of the plurality of memory locations using a predetermined format, the method comprising the steps of:

- detecting an output instruction from a computer software program running on the computer to the predetermined I/O address;
- sensing user input to select the plurality of said positional control devices to provide the generated position data;
- in response to said user-selection, designating at least a portion of the generated position data from each of said selected positional control devices as corresponding a portion of said calculated positional data;

in response to detecting said output instruction, using a memory pointer to indicate a particular location in said memory portion where said selected portions of the generated data are stored; and combining said selected portions of the generated data to generate calculated positional data.

11. A system to emulate the operation of a conventional joystick coupled to a conventional game port, the conventional joystick generating a charging delay time period corresponding to a position of the conventional joystick, the conventional game port having a predetermined input/output (I/O) address in a computer and accessed by a computer software program and setting a first status bit in a data register to a first logic value during the charging delay time period in response to an instruction from the computer software program, the system comprising:

a positional control device generating position data;

an emulator routine to retrieve said position data and to calculate a first time period based on said position data, said calculated first time period corresponding to the charging time period that would be required by the conventional joystick coupled to the conventional game port; and an instruction interceptor to detect the instruction to the conventional game port from the computer software program and to divert program execution to said emulator routine, said emulator routine, in response to diversion by said instruction interceptor, setting the first status bit in the data register to the first logic value for said calculated first time period.

12. The system of claim 11 wherein the computer software program includes an instruction to read the first status bit and said instruction interceptor intercepts the instruction from the computer software program to the predetermined I/O address to read the status bit, said emulator routine determining if said calculated first time period has expired and setting the first status bit to a second logic value after said calculated first time period has expired.

13. The system of claim 11 wherein said instruction interceptor is part of a memory management software program.

14. The system of claim 11 for use with a positional control device generating position data corresponding to a planar position and having first and second coordinates corresponding to the planar position, the data register including a second status bit, said emulator routine further calculating a second time period and, in response to diversion by said instruction interceptor, setting the second status bit to a third logic value for said calculated second time period, said calculated first and second time periods being based on the first and second coordinates of the planar position, respectively.

15. The system of claim 14 wherein the computer software program includes an instruction to read the first and second status bits and said instruction interceptor intercepts the instruction from the computer software program to the predetermined I/O address, said emulator routine determining if either of said calculated first and second time periods have expired and setting said second status bit to a fourth logic value after said calculated second time period has expired.

16. The system of claim 11 for use with a plurality of positional control devices, each coupled to the computer and generating data corresponding to a position input of each of said plurality of positional control devices, the system further including a data source selector, operable by a user, to select one of the plurality of the positional control devices to generate said position data, whereby said positional data is said generated data from said user-selected positional control device.

17. The system of claim 11 for use with a plurality of positional control devices, each coupled to the computer and generating data corresponding to a position input of each of said plurality of positional control devices, the system further including a data source selector, operable by a user, to select the plurality of said positional control devices to generate said position data, said data source selector designating at least a portion of the generated data from each of said selected positional control devices as corresponding to a portion of said position data and combining said selected portions of the generated data to generate said position data.

18. The system of claim 17, further including a plurality of memory locations wherein each of the plurality of positional control devices stores the generated data in a portion of said plurality of memory locations using a predetermined format, said data source selector including a plurality of memory pointers each indicating a particular location in said memory portion where said selected portions of said generated position data are stored.

* * * * *

UNITED STATES PATENT AND TRADEMARK OFFICE
CERTIFICATE OF CORRECTION

PATENT NO.: 5,754,828

DATED: May 19, 1998

INVENTORS: Manolito E. ADAN, *et al.*

It is certified that errors appear in the above-identified patent and that said Letters Patent is hereby corrected as shown below:

In the Detailed Description of the Invention, column 14, line 29, "28" has been replaced with --$2^8$--.

In Claim 1, column 33, line 20, "same" has been replaced with --game--.

Signed and Sealed this

Twenty-seventh Day of March, 2001

*Attest:*

NICHOLAS P. GODICI

*Attesting Officer*

*Acting Director of the United States Patent and Trademark Office*